US012803109B2

(12) United States Patent
Hong et al.

(10) Patent No.: US 12,803,109 B2
(45) Date of Patent: Nov. 17, 2026

(54) BATTERY PACK, AND ENERGY STORAGE SYSTEM AND VEHICLE INCLUDING THE SAME

(71) Applicant: LG ENERGY SOLUTION, LTD., Seoul (KR)

(72) Inventors: Sung-Goen Hong, Daejeon (KR); Seung-Hyun Kim, Daejeon (KR); Young-Hoo Oh, Daejeon (KR); Seung-Min Ok, Daejeon (KR); Sang-Hyun Jo, Daejeon (KR); Young-Bum Cho, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 589 days.

(21) Appl. No.: 18/278,534

(22) PCT Filed: Oct. 14, 2022

(86) PCT No.: PCT/KR2022/015609
§ 371 (c)(1),
(2) Date: Aug. 23, 2023

(87) PCT Pub. No.: WO2023/075240
PCT Pub. Date: May 4, 2023

(65) Prior Publication Data

US 2024/0136652 A1 Apr. 25, 2024
US 2024/0234934 A9 Jul. 11, 2024

(30) Foreign Application Priority Data

Oct. 27, 2021 (KR) ........................ 10-2021-0144935
Dec. 24, 2021 (KR) ........................ 10-2021-0187706
Dec. 24, 2021 (KR) ........................ 10-2021-0187718

(51) Int. Cl.
*H01M 50/367* (2021.01)
*H01M 50/211* (2021.01)
(Continued)

(52) U.S. Cl.
CPC ....... *H01M 50/367* (2021.01); *H01M 50/211* (2021.01); *H01M 50/249* (2021.01);
(Continued)

(58) Field of Classification Search
CPC .. H01M 50/35; H01M 50/367; H01M 50/383; H01M 50/394
See application file for complete search history.

(56) References Cited

U.S. PATENT DOCUMENTS 5,643,691 A 7/1997 Iwatsuki et al.
10,511,002 B2 12/2019 Shimizu et al.
(Continued)

FOREIGN PATENT DOCUMENTS

CN 105531846 A 4/2016
CN 207967135 U 10/2018
(Continued)

OTHER PUBLICATIONS

Extended European Search Report for European Application No. 22887437.6, dated Nov. 14, 2024.
(Continued)

*Primary Examiner* — Brittany L Raymond
(74) *Attorney, Agent, or Firm* — Birch, Stewart, Kolasch & Birch, LLP

(57) ABSTRACT

A battery pack includes a battery module assembly having at least one battery cell, a pack case configured to accommodate the battery module assembly, and a barrier unit provided on at least one side of the pack case, configured to discharge a vent gas in the pack case to the outside of the
(Continued)

pack case and having at least one blocking baffle disposed obliquely to have a predetermined inclination angle.

16 Claims, 32 Drawing Sheets

(51) Int. Cl.
*H01M 50/249* (2021.01)
*H01M 50/251* (2021.01)
*H01M 50/383* (2021.01)

(52) U.S. Cl.
CPC ....... *H01M 50/251* (2021.01); *H01M 50/383* (2021.01); *H01M 2220/10* (2013.01); *H01M 2220/20* (2013.01)

(56) References Cited

U.S. PATENT DOCUMENTS

| | | | | |
|---|---|---|---|---|
| 2011/0206970 | A1 | 8/2011 | Itoi et al. | |
| 2014/0227565 | A1 | 8/2014 | Wan et al. | |
| 2015/0147805 | A1 | 5/2015 | Kim et al. | |
| 2015/0171391 | A1 | 6/2015 | Ahn | |
| 2016/0204404 | A1 | 7/2016 | Shimizu et al. | |
| 2017/0237055 | A1 | 8/2017 | Shimizu et al. | |
| 2018/0108892 | A1 | 4/2018 | Kim et al. | |
| 2018/0269448 | A1 | 9/2018 | Shimizu et al. | |
| 2019/0088914 | A1 | 3/2019 | Choi et al. | |
| 2019/0097192 | A1* | 3/2019 | Kim .................... | H01M 50/394 |
| 2021/0288372 | A1 | 9/2021 | Kim et al. | |
| 2021/0320374 | A1 | 10/2021 | Lee et al. | |
| 2022/0059853 | A1 | 2/2022 | Staeck | |
| 2022/0123429 | A1 | 4/2022 | Yoo et al. | |
| 2022/0149477 | A1* | 5/2022 | Yoshida .............. | H01M 50/249 |
| 2022/0271387 | A1 | 8/2022 | Shin et al. | |
| 2025/0079629 | A1 | 3/2025 | Yoo et al. | |

FOREIGN PATENT DOCUMENTS

| | | | |
|---|---|---|---|
| CN | 111200088 | A | 5/2020 |
| CN | 111554837 | A | 8/2020 |
| CN | 212651524 | U | 3/2021 |
| JP | 7-245089 | A | 9/1995 |
| JP | 2015-135763 | A | 7/2015 |
| JP | 5939307 | B2 | 6/2016 |
| JP | 2018-73559 | A | 5/2018 |
| JP | 6574987 | B2 | 9/2019 |
| JP | 2020-71952 | A | 5/2020 |
| KR | 10-2011-0069122 | A | 6/2011 |
| KR | 10-2014-0109370 | A | 9/2014 |
| KR | 10-2015-0061200 | A | 6/2015 |
| KR | 10-2016-0123852 | A | 10/2016 |
| KR | 10-2017-0044473 | A | 4/2017 |
| KR | 10-2017-0090261 | A | 8/2017 |
| KR | 10-2019-0031835 | A | 3/2019 |
| KR | 10-2019-0041286 | A | 4/2019 |
| KR | 10-1998224 | B1 | 7/2019 |
| KR | 10-2033101 | B1 | 10/2019 |
| KR | 10-2020-0107213 | A | 9/2020 |
| KR | 10-2021-0051543 | A | 5/2021 |
| KR | 10-2021-0063939 | A | 6/2021 |
| KR | 10-2021-0095994 | A | 8/2021 |
| KR | 10-2021-0114752 | A | 9/2021 |
| WO | WO 2016/136193 | A1 | 9/2016 |
| WO | WO 2020-188949 | * | 9/2020 |

OTHER PUBLICATIONS

International Search Report (PCT/ISA/210) issued in PCT/KR2022/015609, dated Jan. 26, 2023.

* cited by examiner

BATTERY PACK, AND ENERGY STORAGE SYSTEM AND VEHICLE INCLUDING THE SAME

TECHNICAL FIELD

The present disclosure relates to a battery pack, and an energy storage system and a vehicle including the same.

The present application claims priority to Korean Patent Application No. 10-2021-0144935 filed on Oct. 27, 2021 in the Republic of Korea, Korean Patent Application No. 10-2021-0187706 filed on Dec. 24, 2021 in the Republic of Korea, and Korean Patent Application No. 10-2021-0187718 filed on Dec. 24, 2021 in the Republic of Korea, the disclosures of which are incorporated herein by reference.

BACKGROUND ART

Secondary batteries have high applicability according to product groups and electrical characteristics such as high energy density, and thus, are commonly applied not only to mobile devices but also to electric vehicles (EVs) or hybrid vehicles (HEVs) driven by electric power sources. Because secondary batteries may radically reduce the use of fossil fuel and do not generate any by-products that come with energy consumption, the secondary batteries are gaining attention as a new alternative energy source for improving eco-friendliness and energy efficiency.

Types of secondary batteries that are currently widely used include lithium-ion batteries, lithium polymer batteries, nickel cadmium batteries, nickel hydride batteries, and nickel zinc batteries. An operating voltage of a unit secondary battery cell, that is, a unit battery cell, ranges from about 2.5 V to about 4.5 V. Accordingly, when a higher output voltage is required, a battery pack may be configured by connecting a plurality of battery cells in series. Also, a battery pack may be configured by connecting a plurality of battery cells in parallel according to charge/discharge capacity required for the battery pack. Accordingly, the number of battery cells included in a battery pack may be set in various ways according to a required output voltage or charge/discharge capacity.

When a battery pack is configured by connecting a plurality of battery cells in series/parallel, a method of first configuring a battery module including at least one battery cell and adding other elements by using the at least one battery module to configure a battery pack or battery rack is general.

A conventional battery pack generally includes a battery module assembly having at least one battery cell and a pack case accommodating the battery module assembly. In the case of a conventional battery pack, when thermal runaway occurs in a battery cell due to an abnormal situation, a vent gas, flame or spark is generated from the battery cell. To prevent fire or explosion of the battery pack, it is necessary to discharge the vent gas inside the battery pack to the outside of the battery pack.

However, when the vent gas is discharged to the outside of the battery pack, if the flame or spark is also discharged to the outside of the battery pack together with the vent gas, a larger fire or explosion may be caused due to the flame or spark discharged to the outside.

Therefore, it is requested to find a way to provide a battery pack that may block external exposure of the flame or spark generated in an abnormal situation of a battery cell, an energy storage system and a vehicle including the battery pack.

DISCLOSURE

Technical Problem

The present disclosure is directed to providing a battery pack that may block external exposure of the flame or spark generated in an abnormal situation of a battery cell, an energy storage system and a vehicle including the battery pack.

Technical Solution

In one aspect of the present disclosure, there is provided a battery pack comprising: a battery module assembly including at least one battery cell; a pack case configured to accommodate the battery module assembly; and a barrier provided on at least one side of the pack case, the barrier configured to discharge a vent gas in the pack case to outside of the pack case and having at least one blocking baffle disposed obliquely to a side of the pack case at a predetermined inclination angle.

Preferably, the barrier may include a first barrier coupled to the pack case and having the at least one blocking baffle; and a second barrier coupled to the first barrier and configured to cover the at least one blocking baffle in a longitudinal direction of the pack case.

Preferably, a first surface of the first barrier may face the battery module assembly in the longitudinal direction of the pack case.

Preferably, the first barrier may be provided with at least one vent hole for discharging the vent gas to the outside of the pack case.

Preferably, the at least one blocking baffle may be provided on a second surface of the first barrier and at least partially covers the at least one vent hole.

Preferably, the second barrier may be spaced apart from the at least one vent hole by a predetermined interval in the longitudinal direction of the pack case to form a predetermined space.

Preferably, the at least one blocking baffle may be disposed in the predetermined space.

Preferably, the at least one blocking baffle may be a pair of blocking baffles, and the at least one vent hole may be disposed between the pair of blocking baffles.

Preferably, the barrier may include at least one discharge opening communicating with the predetermined space along a height direction of the pack case and formed by coupling the first barrier and the second barrier.

Preferably, the at least one discharge opening may include an upper opening provided at an upper side of the barrier; and a lower opening spaced apart from the upper opening and provided at a lower side of the barrier.

Preferably, the barrier may be provided at both ends of the pack case in the longitudinal direction of the pack case.

In another aspect of the present disclosure, there is also provided a battery pack comprising: a battery module assembly including at least one battery cell; a pack case configured to accommodate the battery module assembly; and a barrier provided on at least one side of the pack case, the barrier configured to discharge a vent gas in the pack case to the outside of the pack case and having at least one blocking baffle with a mesh structure.

In another aspect of the present disclosure, there is also provided a battery pack comprising: a battery module assembly including at least one battery cell; a pack case configured to accommodate the battery module assembly; and a barrier provided on at least one side of the pack case, the barrier configured to discharge a vent gas in the pack case to the outside of the pack case and having a predetermined space for blocking flame or spark generated from the at least one battery cell.

In another aspect of the present disclosure, there is also provided an energy storage system including at least one battery pack according to the above embodiments.

In another aspect of the present disclosure, there is also provided a vehicle including at least one battery pack according to the above embodiments.

A mesh may cover the at least one discharge opening of the barrier.

The blocking baffle may be a pair of baffles, each baffle of the pair of baffles having a first end connected to the pack case, and the mesh structure may extend between second ends of the pair of baffles.

Advantageous Effects

According to various embodiments as described above, it is possible to provide a battery pack capable of blocking external exposure of a flame or spark generated in an abnormal situation of a battery cell, and an energy storage system and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will now be described more fully with reference to the accompanying drawings, in which exemplary embodiments of the present disclosure are shown. These embodiments are provided so that the present disclosure will be thorough and complete, and will fully convey the concept of the present disclosure to one of ordinary skill in the art, and the present disclosure may be embodied in many different forms and should not be construed as being limited to the embodiments set forth herein. In addition, in order to help the understanding of the present disclosure, the accompanying drawings are not drawn to scale, but dimensions of some components may be exaggerated.

Figure 1:
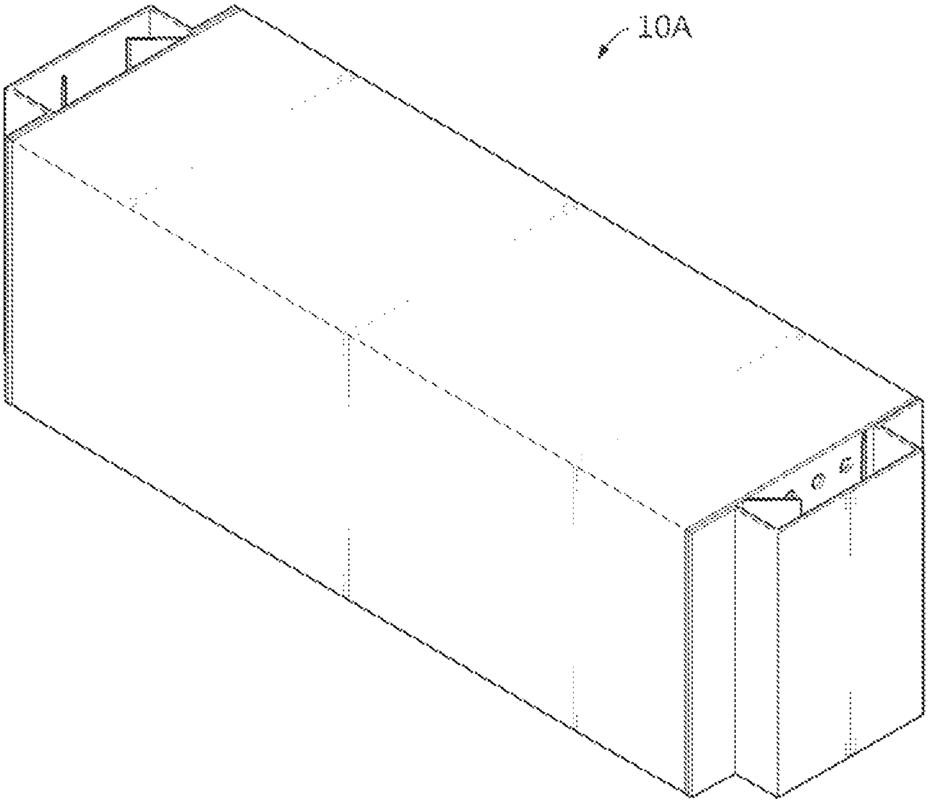
FIG. 1 is a diagram for explaining a battery pack according to an embodiment of the present disclosure.
Figure 2:
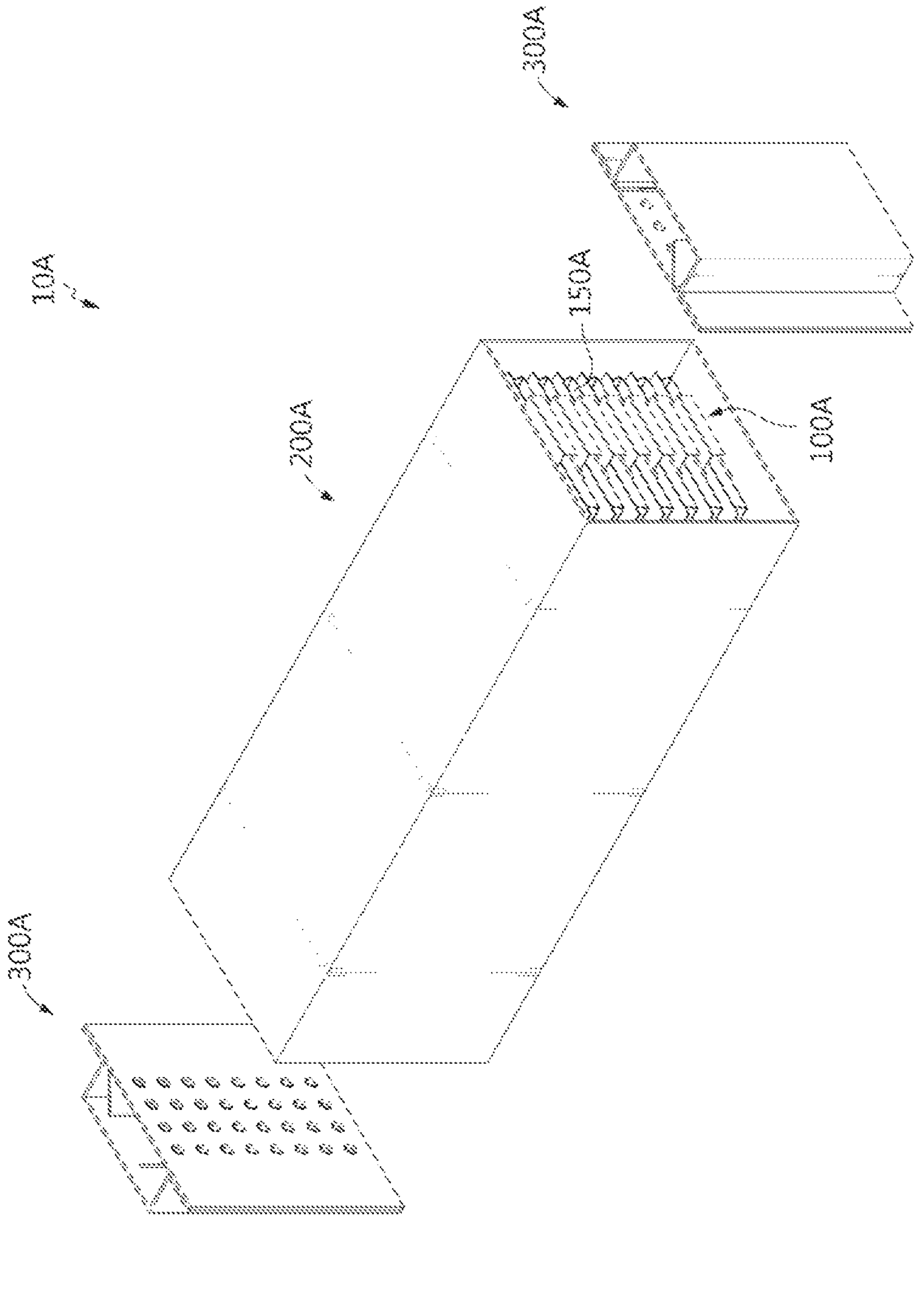
FIG. 2 is an exploded perspective view of the battery pack of FIG. 1.

FIG. 1 is a diagram for explaining a battery pack according to an embodiment of the present disclosure, and FIG. 2 is an exploded perspective view of the battery pack of FIG. 1.

Referring to FIGS. 1 and 2, a battery pack 10A may include a battery module assembly 100A, a pack case 200A, and a barrier unit 300A.

The battery module assembly 100A may include at least one or a plurality of battery cells 150A. Hereinafter, in this embodiment, the battery module assembly 100A is limitedly described as including a plurality of battery cells 150A.

The plurality of battery cells 150A may be stacked with each other along the height direction of the battery module assembly 100A to be electrically connected to each other. In addition, the plurality of battery cells 150A may also be stacked with each other along the longitudinal direction of the battery module assembly 100A. Also, the plurality of battery cells 150A may be stacked with each other in both the longitudinal direction and the height direction of the battery module assembly 100A.

The plurality of battery cells 150A are secondary batteries, and may be provided as a pouch-type secondary battery, a prismatic secondary battery, or a cylindrical secondary battery. Hereinafter, in this embodiment, the plurality of battery cells 150A will be described as being provided as a pouch-type secondary battery.

The pack case 200A may accommodate the battery module assembly 100A. To this end, an accommodation space for accommodating the battery module assembly 100A may be provided in the pack case 200A.

The pack case 200A is formed with a predetermined length along the longitudinal direction of the battery pack 10A, and may be provided in a rectangular parallelepiped shape that is open in the longitudinal direction of the battery pack 10A.

The barrier unit 300A is provided on at least one side of the pack case 200A, discharges a vent gas (G, see FIGS. 7 to 10) in the pack case 200A to the outside of the pack case 200A, and may have at least one blocking baffle 350A for blocking flame or spark (F, see FIGS. 7 to 10) generated from the at least one battery cell 150A.

The barrier unit 300A may be provided as a pair.

The pair of barrier units 300A may be provided at both ends of the pack case 200A in the longitudinal direction of the pack case 200A. Specifically, the pair of barrier units 300A may be coupled to the pack case 200A in the longitudinal direction of the pack case 200A, respectively. The pair of barrier units 300A may package the battery module assembly 100A in the pack case 200A through coupling with the pack case 200A.

Hereinafter, the barrier unit 300A according to this embodiment will be described in more detail.

Figure 3:
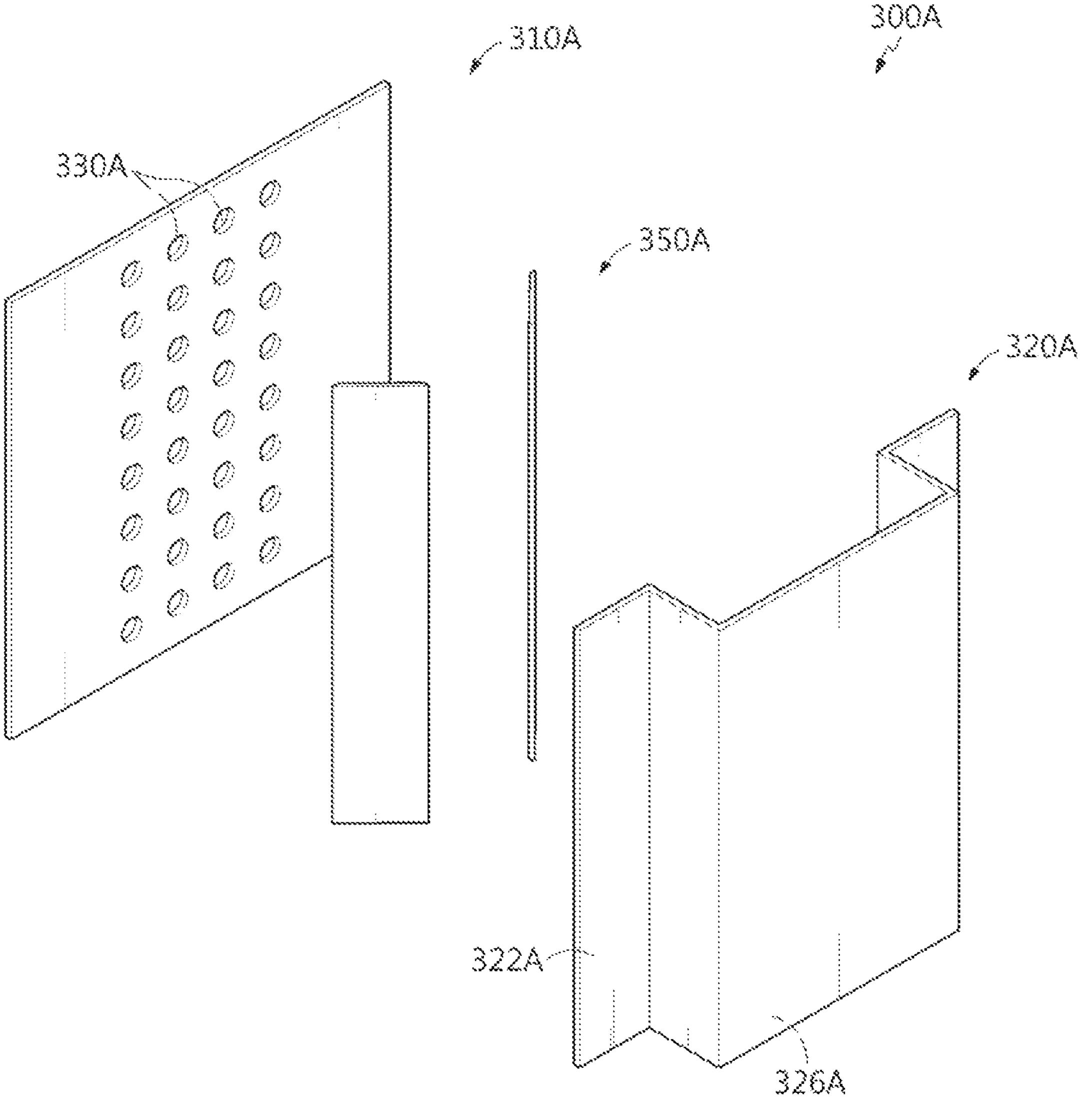
FIG. 3 is an exploded perspective view of a barrier unit of the battery pack of FIG. 2.
Figure 4:
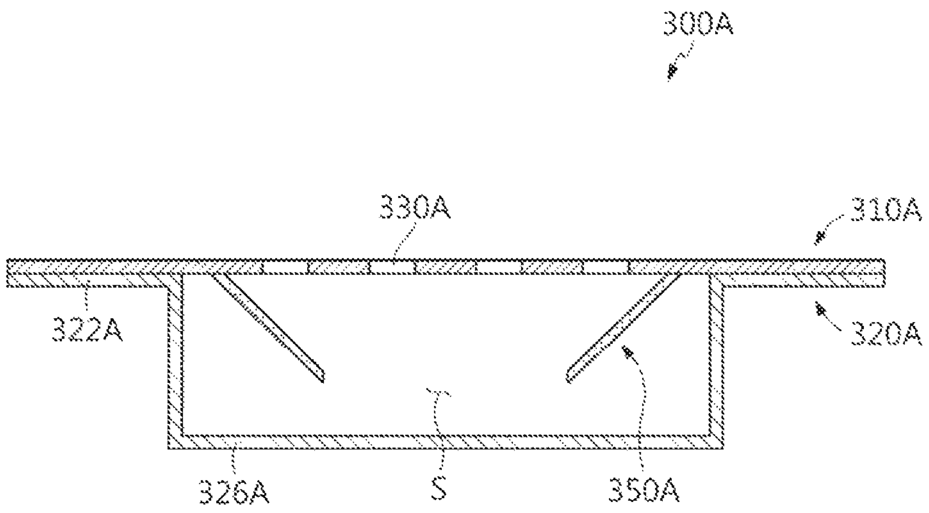
FIG. 4 is a plan view of the battery pack of FIG. 2.
Figure 5:
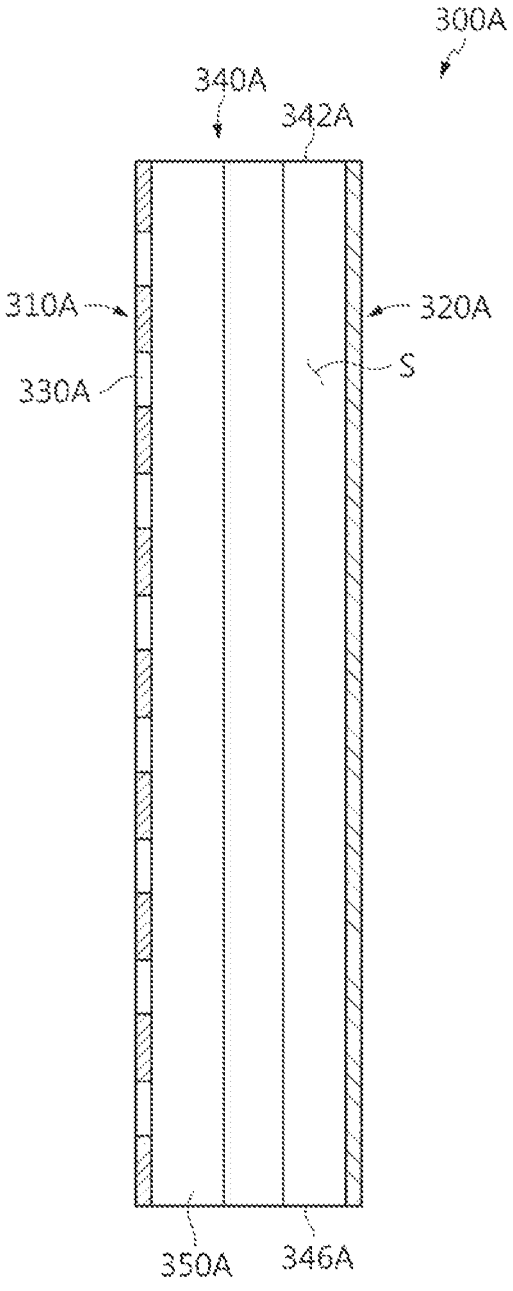
FIG. 5 is a cross-sectional side view of the battery pack of FIG. 2.

FIG. 3 is an exploded perspective view of a barrier unit of the battery pack of FIG. 2, FIG. 4 is a plan view of the battery pack of FIG. 2, and FIG. 5 is a cross-sectional side view of the battery pack of FIG. 2.

Referring to FIGS. 3 to 5, the pair of barrier units 300A may include a first barrier 310A, a second barrier 320A, a vent hole 330A, a discharge opening 340A, and a blocking baffle 350A, respectively.

The first barrier 310A has a substantially plate shape, is coupled to the pack case 200A in the longitudinal direction of the pack case 200A, and may include the at least one blocking baffle 350A.

One surface of the first barrier 310A may face at least one battery cell 150A disposed at the outermost part of the battery module assembly 100A in the longitudinal direction of the pack case 200A. In the case of this embodiment, one surface of the first barrier 310A may be disposed to face a plurality of battery cells 150A disposed at the outermost part of the battery module assembly 100A.

The second barrier 320A is coupled with the first barrier 310A and may cover the blocking baffle 350A in the longitudinal direction of the pack case 200A. The second barrier 320A may be provided as a substantially U-shaped plate.

The second barrier 320A may be spaced apart from at least one vent hole 330A described later by a predetermined interval in the longitudinal direction of the pack case 200A to form a predetermined space S.

The second barrier 320A may include a coupling portion 322A and a space forming portion 326A.

The coupling portion 322A is formed at both ends of the second barrier 320A and may be coupled to the first barrier 310A. The space forming portion 326A is formed by bending from the coupling portion 322A, and the space S may be formed by coupling the coupling portion 322A and the first barrier 310A.

The vent hole 330A is for discharging the vent gas (G, see FIGS. 7 to 10) to the outside of the pack case 200A, and may be provided in the first barrier 310A.

The vent hole 330A may be provided in at least one or in plurality. Hereinafter, in this embodiment, the vent hole 330A will be described as being provided in plurality.

The discharge opening 340A is for discharging the vent gas (G, see FIGS. 7 to 10) to the outside of the pack case 200A, communicates with the space S along the height direction of the pack case 200A, and may be formed by coupling the first barrier 310A and the second barrier 320A.

The discharge opening 340A may include an upper opening 342A and a lower opening 346A.

The upper opening 342A may be provided at an upper side of the barrier unit 300A. The lower opening 346A is spaced apart from the upper opening 342A and may be provided at a lower side of the barrier unit 300A.

The blocking baffle 350A is provided on the other surface of the first barrier 310A, and may at least partially cover at least one vent hole 330A, or in this embodiment, a plurality of vent holes 330A.

The blocking baffle 350A may be disposed obliquely to have a predetermined inclination angle. Through the oblique arrangement with such an inclination angle, the blocking baffle 350A may give directionality to the movement direction of the flame or spark emitted in an abnormal situation.

The blocking baffle 350A may be provided in at least one or in plurality. Hereinafter, in this embodiment, the blocking baffle 350A will be described as being provided as a pair. At least one vent hole 330A, or in this embodiment, a plurality of vent holes 330A may be disposed between the pair of blocking baffles 350A.

The pair of blocking baffles 350A may be disposed in a form surrounding the plurality of vent holes 330A in the space S when viewed from the top and bottom directions of the battery pack 10A. Here, the pair of blocking baffles 350A, when viewed from the top and bottom directions of the battery pack 10A, may be disposed to be spaced apart from each other by a predetermined distance to form a predetermined interval in the space S.

According to the arrangement of the pair of blocking baffles 350A, the flame or spark (F, see FIGS. 7 to 10) emitted from the battery cell 150A collides with the blocking baffle 350A in the traveling direction after passing through the vent holes 330A, and thus may not be exposed to the outside of the discharge opening 340A.

Figure 6:
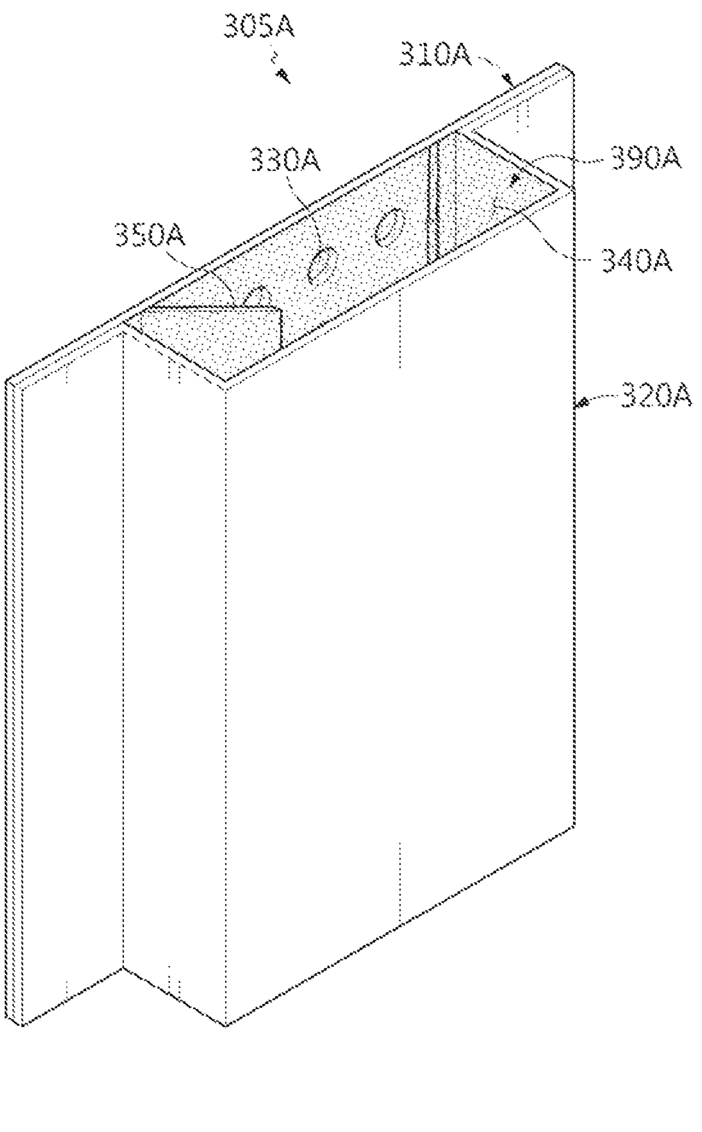
FIG. 6 is a diagram for explaining a barrier unit according to another embodiment of the present disclosure of FIG. 2.
Figure 7:
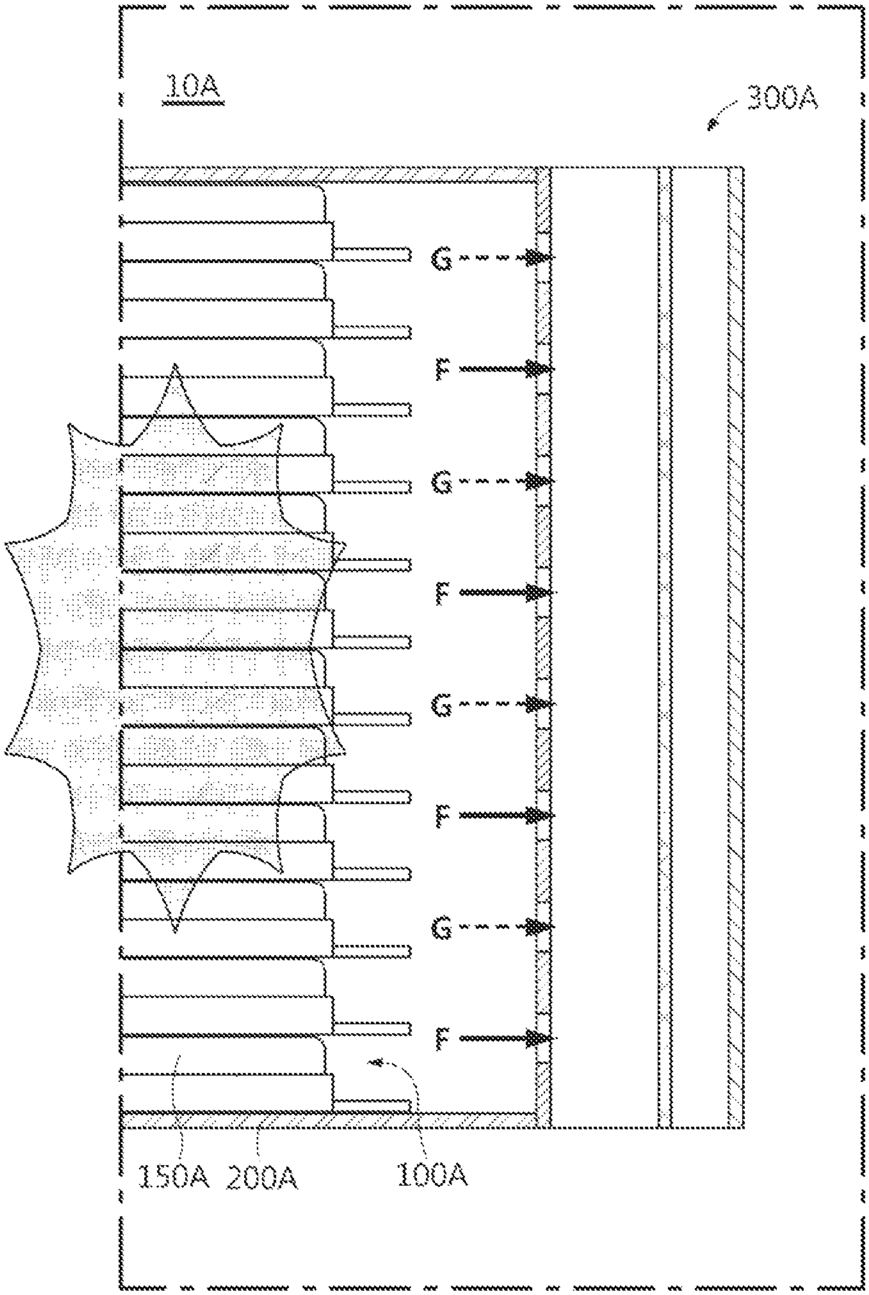
FIGS. 7 to 10 are diagrams for explaining blocking of external exposure of a flame or spark through the barrier unit during thermal runaway of a battery cell of the battery pack of FIG. 1.
Figure 8:
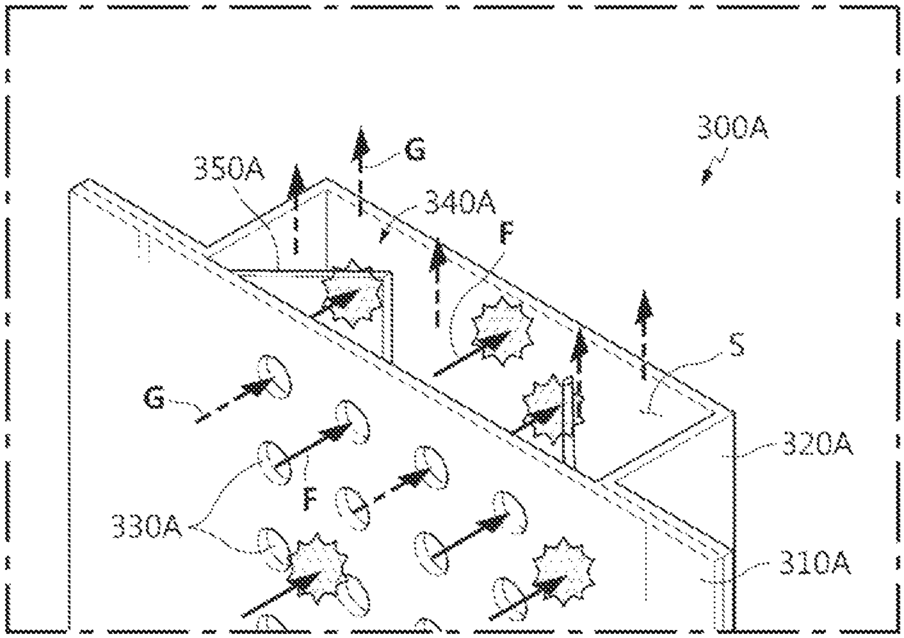
Figure 9:
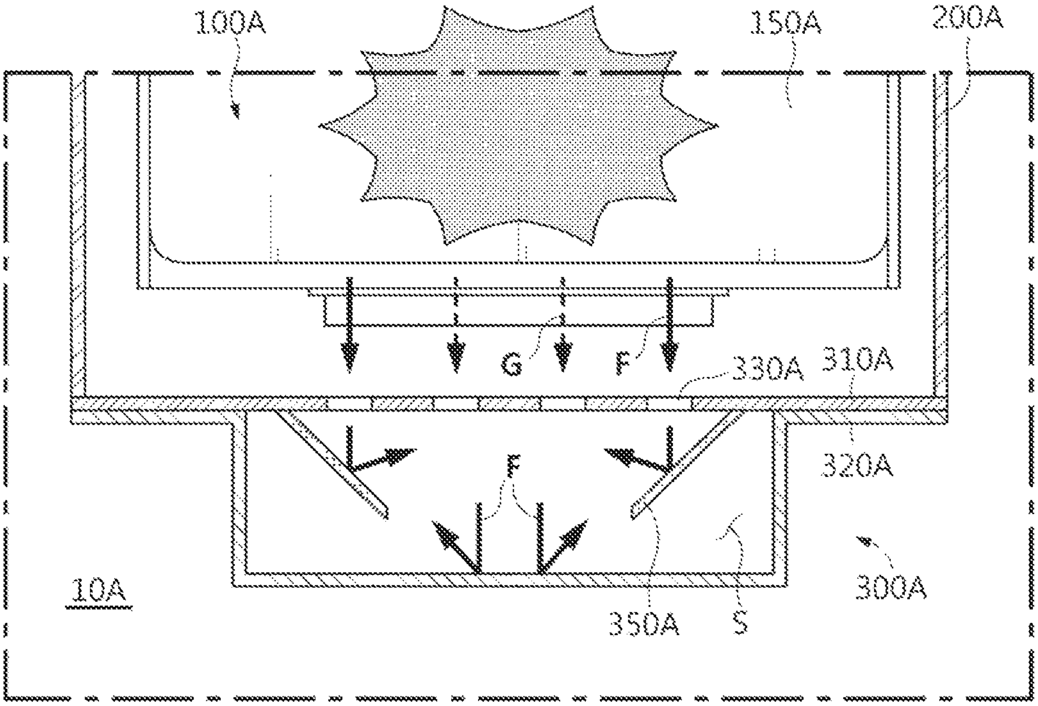
Figure 10:
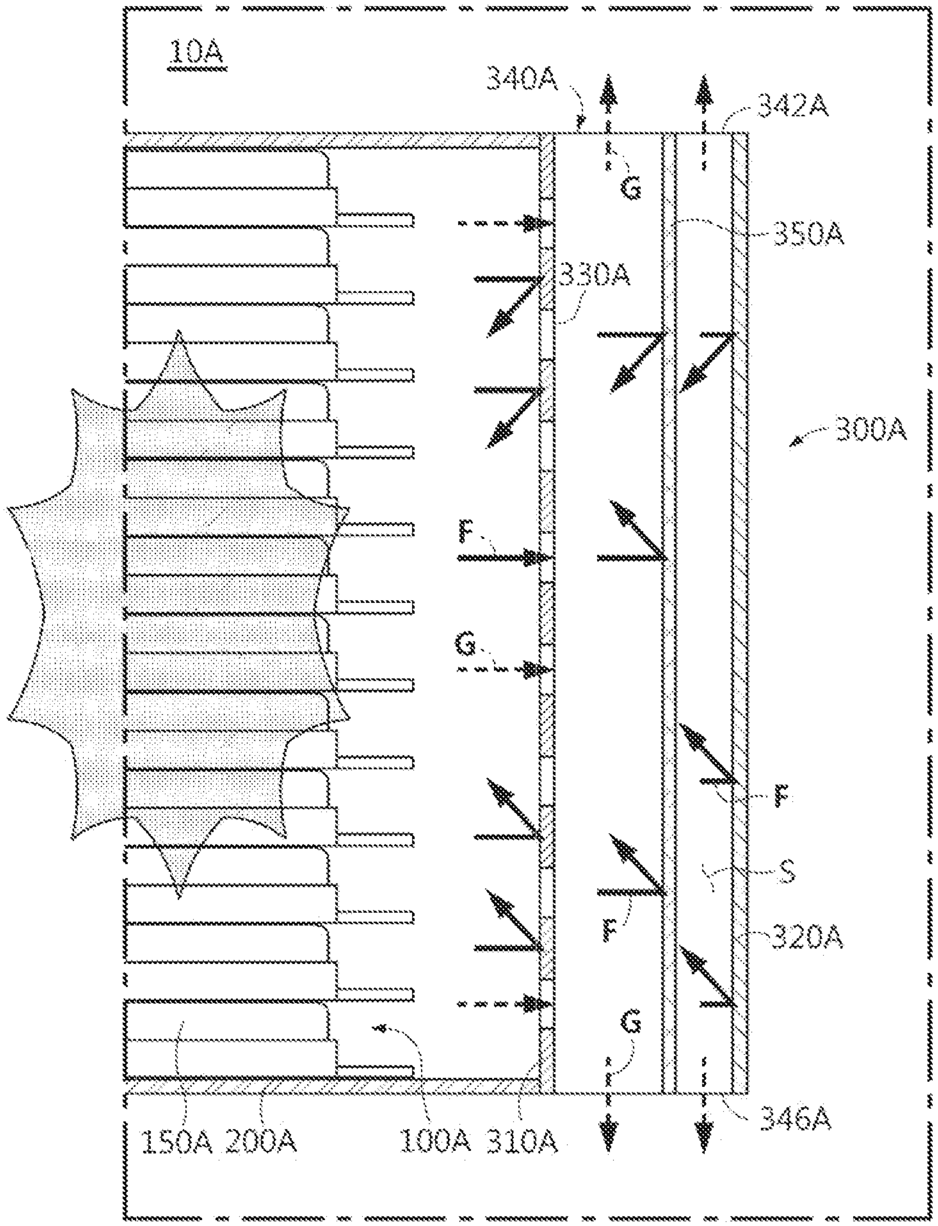

FIG. 6 is a diagram for explaining a barrier unit according to another embodiment of the present disclosure of FIG. 2.

Since the barrier unit 305A according to this embodiment is similar to the barrier unit 300A of the above embodiment, redundant description of components substantially the same as or similar to the above embodiment will be omitted, and hereinafter, differences from the above embodiment will be described.

The barrier unit 305A is provided as a pair and may include the first barrier 310A, the second barrier 320A, the vent hole 330A, the discharge opening 340A, the blocking baffle 350A, and the third barrier 390A, respectively.

Since the first barrier 310A, the second barrier 320A, the vent hole 330A, the discharge opening 340A, and the blocking baffle 350A are substantially the same as or similar to the above embodiment, redundant descriptions thereof are omitted.

The third barrier 390A covers the discharge opening 340A and may include a mesh network. The third barrier 390A may allow the vent gas (G, see FIGS. 7 to 10) to pass while maximally suppressing the passage of the flame or spark (F, see FIGS. 7 to 10) through the mesh network.

Accordingly, the barrier unit 305A according to this embodiment may more effectively block or suppress external exposure of the flame or spark (F, see FIGS. 7 to 10).

FIGS. 7 to 10 are diagrams for explaining blocking of external exposure of a flame or spark through the barrier unit during thermal runaway of a battery cell of the battery pack of FIG. 1.

Referring to FIGS. 7 to 10, in at least one battery cell 150A among the battery cells 150A of the battery module assembly 100A of the battery pack 10A, overheating or the like may occur due to an abnormal situation. In at least one battery cell 150A in which such an abnormal situation occurs, a vent gas G, flame or spark F may be discharged due to overheating or the like.

At this time, the barrier unit 300A according to this embodiment guides the discharge of the vent gas G to the outside of the pack case 200A and thus may effectively prevent thermal runaway or explosion of the entire battery module assembly 100A due to the vent gas G inside the battery pack 10A.

Specifically, the barrier unit 300A guides the vent gas G into the space S through the vent holes 330A, and then may discharge the vent gas G to the outside of the pack case 200A through the upper opening 342A and the lower opening 346A of the discharge opening 340A.

In addition, the barrier unit 300A according to this embodiment may effectively prevent or suppress external exposure or ejection of the flame or spark F through the upper opening 342A and the lower opening 346A of the discharge opening 340A.

Specifically, the first barrier 310A of the barrier unit 300A may primarily block the flame or spark F. Here, the flame or spark F passing through the vent holes 330A of the first barrier 310A may be secondarily blocked by the pair of blocking baffles 350A in the space S. Finally, the flame or spark F passing between the pair of blocking baffles 350A may be blocked by the second barrier 320A.

As such, the barrier unit 300A according to this embodiment blocks the flame or spark F emitted from the battery cell 150A in which the abnormal situation occurs through the first barrier 310A, the pair of blocking baffles 350A and the second barrier 320A in multiple stages, and thus exposure or ejection of the flame or spark F to the outside of the discharge opening 340A may be prevented or significantly suppressed.

Accordingly, the barrier unit 300A according to this embodiment may guide the rapid discharge of the vent gas G emitted from the battery cell 150A to the outside of the pack case 200A in the abnormal situation, while, conversely, effectively preventing or suppressing exposure or ejection of the flame or spark F emitted from the battery cell 150A to the outside of the pack case 200A.

Therefore, the battery pack 10A according to this embodiment may effectively prevent a risk of greater fire or explosion that may be caused by the flame or spark F discharged to the outside of the pack case 200A in the abnormal situation.

Figure 11:
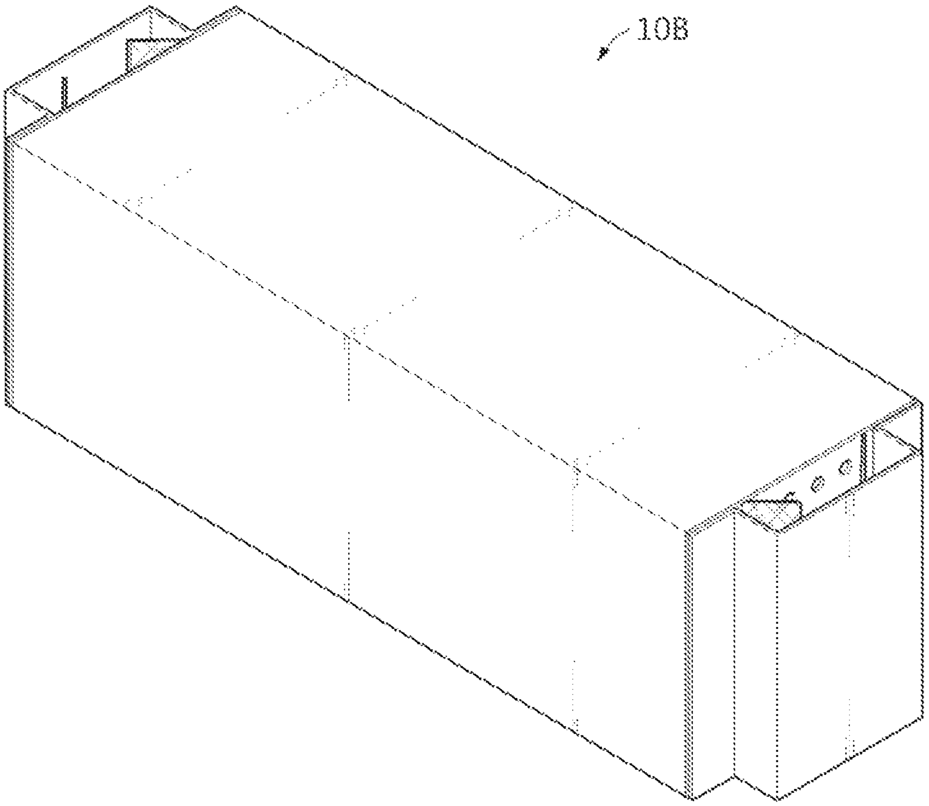
FIG. 11 is a diagram for explaining a battery pack according to still another embodiment of the present disclosure.
Figure 12:
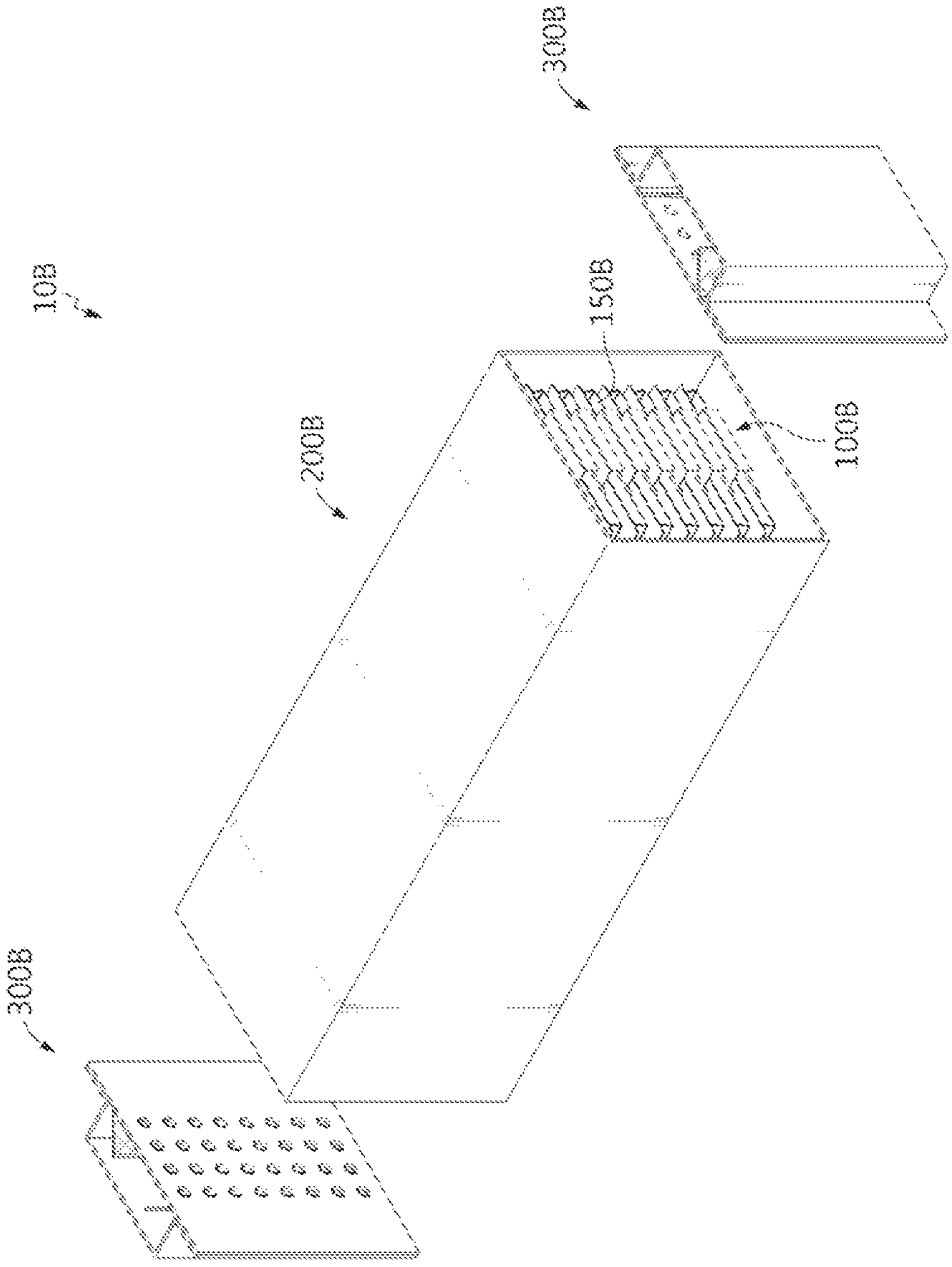
FIG. 12 is an exploded perspective view of the battery pack of FIG. 11.

FIG. 11 is a diagram for explaining a battery pack according to still another embodiment of the present disclosure, and FIG. 12 is an exploded perspective view of the battery pack of FIG. 11.

Referring to FIGS. 11 and 12, the battery pack 10B may include a battery module assembly 100B, a pack case 200B, and a barrier unit 300B.

As in the above embodiment, the battery module assembly 100B may include at least one or a plurality of battery cells 150B. Hereinafter, in this embodiment, the battery module assembly 100B is limitedly described as including a plurality of battery cells 150B.

As in the above embodiment, the plurality of battery cells 150B may be stacked with each other along the height direction of the battery module assembly 100B to be electrically connected to each other. In addition, the plurality of battery cells 150B may also be stacked with each other along the longitudinal direction of the battery module assembly 100B. Also, the plurality of battery cells 150B may be stacked with each other in both the longitudinal direction and the height direction of the battery module assembly 100B.

As in the above embodiment, the plurality of battery cells 150B are secondary batteries, and may be provided as a pouch-type secondary battery, a prismatic secondary battery, or a cylindrical secondary battery. Hereinafter, in this embodiment, the plurality of battery cells 150B will be described as being provided as a pouch-type secondary battery.

The pack case 200B may accommodate the battery module assembly 100B, as in the above embodiment. To this end, an accommodation space for accommodating the battery module assembly 100B may be provided in the pack case 200B.

The pack case 200B is formed with a predetermined length along the longitudinal direction of the battery pack 10B, and may be provided in a rectangular parallelepiped shape that is open in the longitudinal direction of the battery pack 10B.

The barrier unit 300B, as in the above embodiment, is provided on at least one side of the pack case 200B, discharges a vent gas (G, see FIGS. 17 to 20) in the pack case 200B to the outside of the pack case 200B, and may have at least one blocking baffle 350B for blocking flame or spark (F, see FIGS. 17 to 20) generated from the at least one battery cell 150B.

The barrier unit 300B may be provided as a pair.

As in the above embodiment, the pair of barrier units 300B may be provided at both ends of the pack case 200B in the longitudinal direction of the pack case 200B. Specifically, the pair of barrier units 300B may be coupled with the pack case 200B in the longitudinal direction of the pack case 200B, respectively. The pair of barrier units 300B may package the battery module assembly 100B in the pack case 200B through coupling with the pack case 200B.

Hereinafter, the barrier unit 300B according to this embodiment will be described in more detail.

Figure 13:
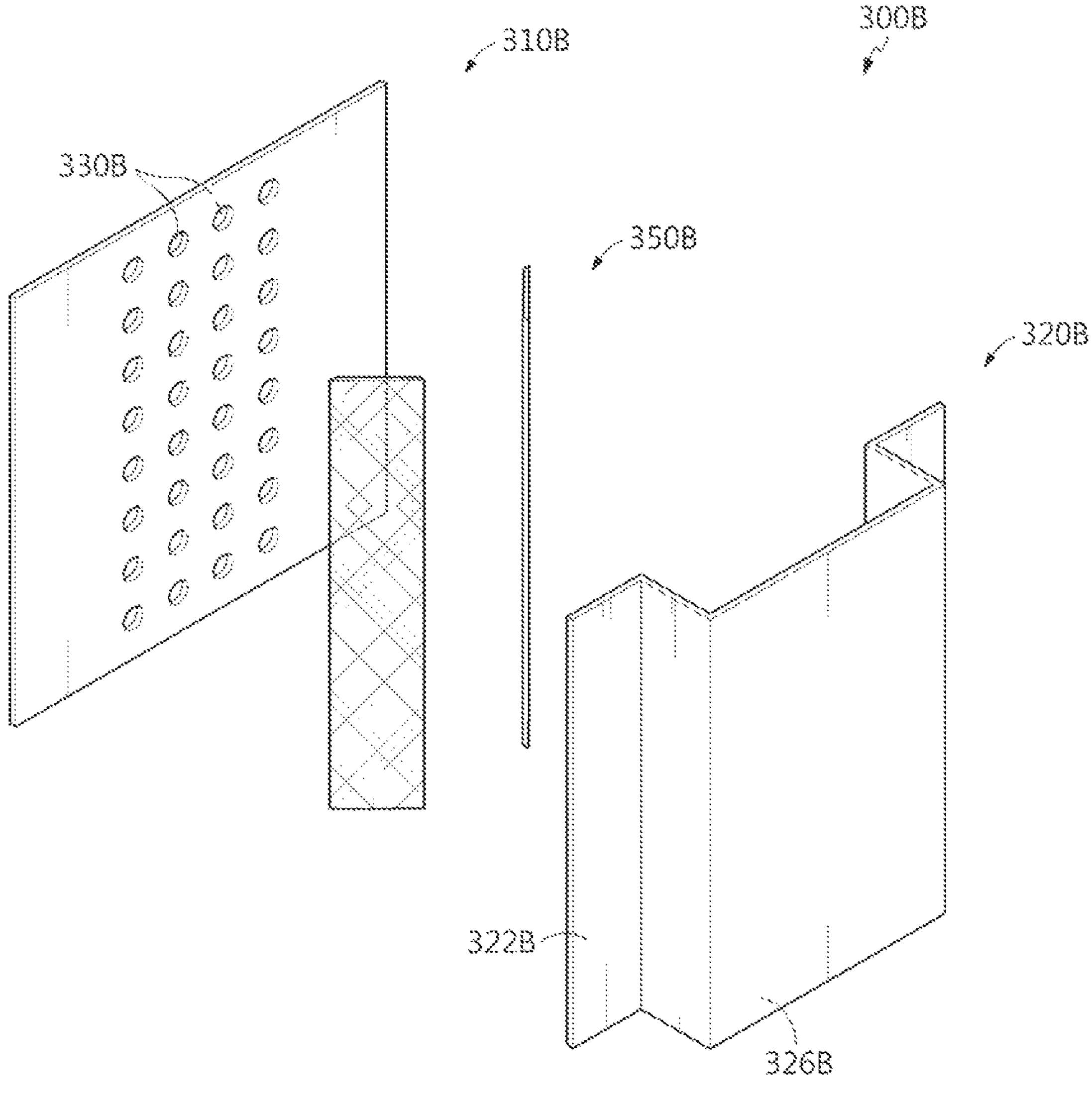
FIG. 13 is an exploded perspective view of a barrier unit of the battery pack of FIG. 12.
Figure 14:
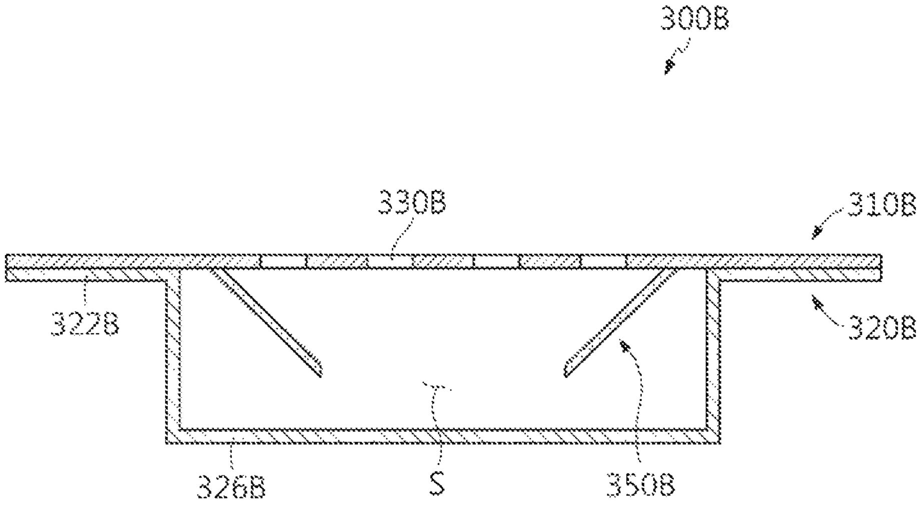
FIG. 14 is a plan view of the battery pack of FIG. 12.
Figure 15:
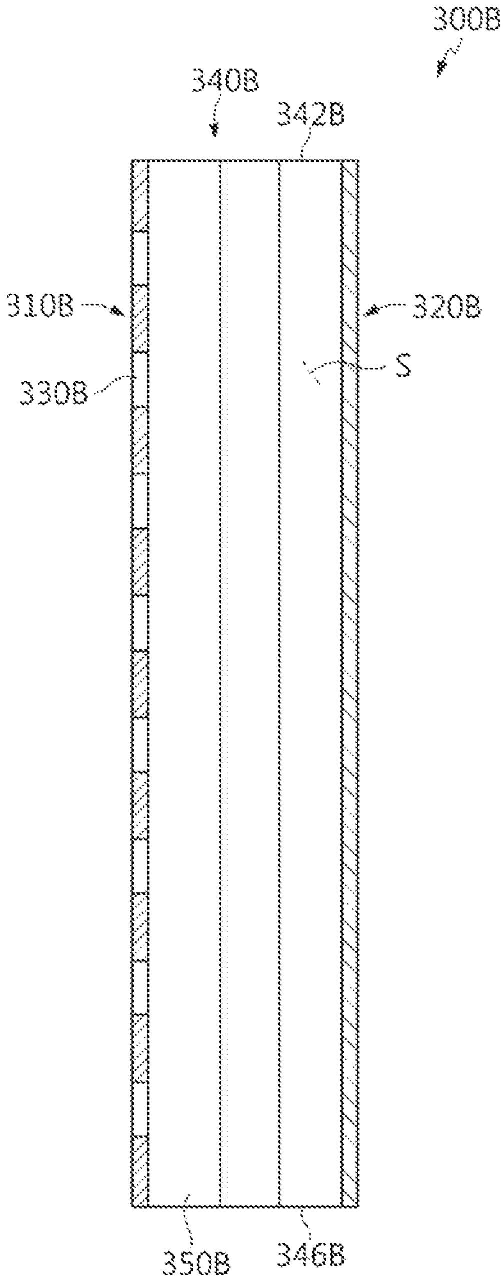
FIG. 15 is a cross-sectional side view of the battery pack of FIG. 12.

FIG. 13 is an exploded perspective view of a barrier unit of the battery pack of FIG. 12, FIG. 14 is a plan view of the battery pack of FIG. 12, and FIG. 15 is a cross-sectional side view of the battery pack of FIG. 12.

Referring to FIGS. 13 to 15, the pair of barrier units 300B may include a first barrier 310B, a second barrier 320B, a vent hole 330B, a discharge opening 340B, and a blocking baffle 350B, respectively.

The first barrier 310B, as in the above embodiment, has a substantially plate shape, is coupled to the pack case 200B in the longitudinal direction of the pack case 200B, and may include the at least one blocking baffle 350B.

One surface of the first barrier 310B may be disposed to face at least one battery cell 150B disposed at the outermost part of the battery module assembly 100B in the longitudinal direction of the pack case 200B. In the case of this embodiment, one surface of the first barrier 310B may be disposed to face a plurality of battery cells 150B disposed at the outermost part of the battery module assembly 100B.

The second barrier 320B, as in the above embodiment, is coupled with the first barrier 310B and may cover the blocking baffle 350B in the longitudinal direction of the pack case 200B. The second barrier 320B may be provided as a substantially U-shaped plate.

The second barrier 320B may be spaced apart from at least one vent hole 330B described later by a predetermined interval in the longitudinal direction of the pack case 200B to form a predetermined space S.

The second barrier 320B may include a coupling portion 322B and a space forming portion 326B.

As in the above embodiment, the coupling portion 322B is formed at both ends of the second barrier 320B and may be coupled to the first barrier 310B. The space forming portion 326B is formed by bending from the coupling portion 322B, and the space S may be formed by coupling the coupling portion 322B and the first barrier 310B.

The vent hole 330B, as in the above embodiment, is for exporting the vent gas (G, see FIGS. 17 to 20) to the outside of the pack case 200B, and may be provided in the first barrier 310B.

The vent hole 330B may be provided in at least one or in plurality. Hereinafter, in this embodiment, the vent hole 330B will be described as being provided in plurality.

The discharge opening 340B is for discharging the vent gas (G, see FIGS. 17 to 20) to the outside of the pack case 200B, communicates with the space S along the height direction of the pack case 200B, and may be formed by coupling the first barrier 310B and the second barrier 320B.

The discharge opening 340B may include an upper opening 342B and a lower opening 346B.

The upper opening 342B, as in the above embodiment, may be provided at an upper side of the barrier unit 300B. The lower opening 346B is spaced apart from the upper opening 342B and may be provided at a lower side of the barrier unit 300B.

The blocking baffle 350B is provided on the other surface of the first barrier 310B, and may at least partially cover at least one vent holes 330B, or in this embodiment, a plurality of vent holes 330B.

The blocking baffle 350B is disposed in the space S and may be provided between the first barrier 310B and the second barrier 320B. Specifically, the blocking baffle 350B may have a predetermined mesh structure. Predetermined pores are formed in the predetermined mesh structure, and the predetermined pores may be prepared in a size capable of filtering the flame or spark.

As in the above embodiment, the blocking baffle 350B may be disposed obliquely to have a predetermined inclination angle. Through an oblique arrangement with such an inclination angle, the blocking baffle 350B may give directionality to the movement direction of the flame or spark emitted in an abnormal situation.

As in the above embodiment, the blocking baffle 350B may be provided in at least one or in plurality. Hereinafter, in this embodiment, the blocking baffle 350B will be described as being provided as a pair. At least one vent hole 330B, or in this embodiment, a plurality of vent holes 330B may be disposed between the pair of blocking baffles 350B.

The pair of blocking baffles 350B may be disposed in a form surrounding the plurality of vent holes 330B in the space S when viewed from the top and bottom directions of the battery pack 10B. Here, the pair of blocking baffles 350B, when viewed from the top and bottom directions of the battery pack 10B, may be disposed to be spaced apart from each other by a predetermined distance to form a predetermined interval in the space S.

According to the arrangement of the pair of blocking baffles 350B, the flame or spark (F, see FIGS. 17 to 20) emitted from the battery cell 150B collides with the blocking baffle 350B in the traveling direction after passing through the vent holes 330B, and thus may not be exposed to the outside of the discharge opening 340B.

Figure 16:
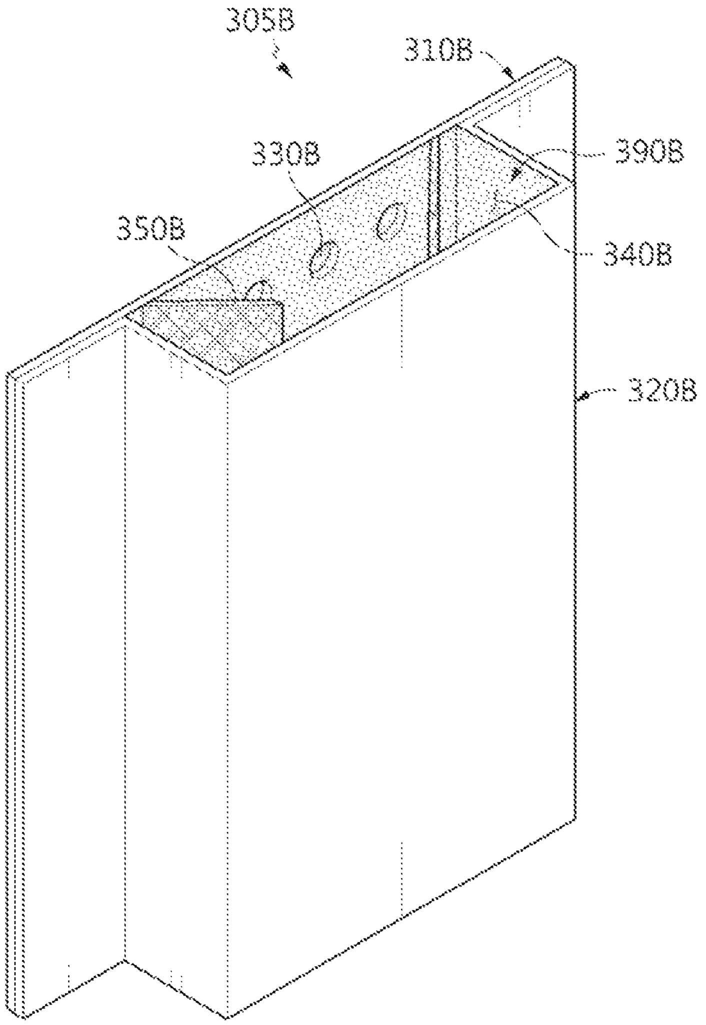
FIG. 16 is a diagram for explaining a barrier unit according to another embodiment of the present disclosure of FIG. 12.
Figure 17:
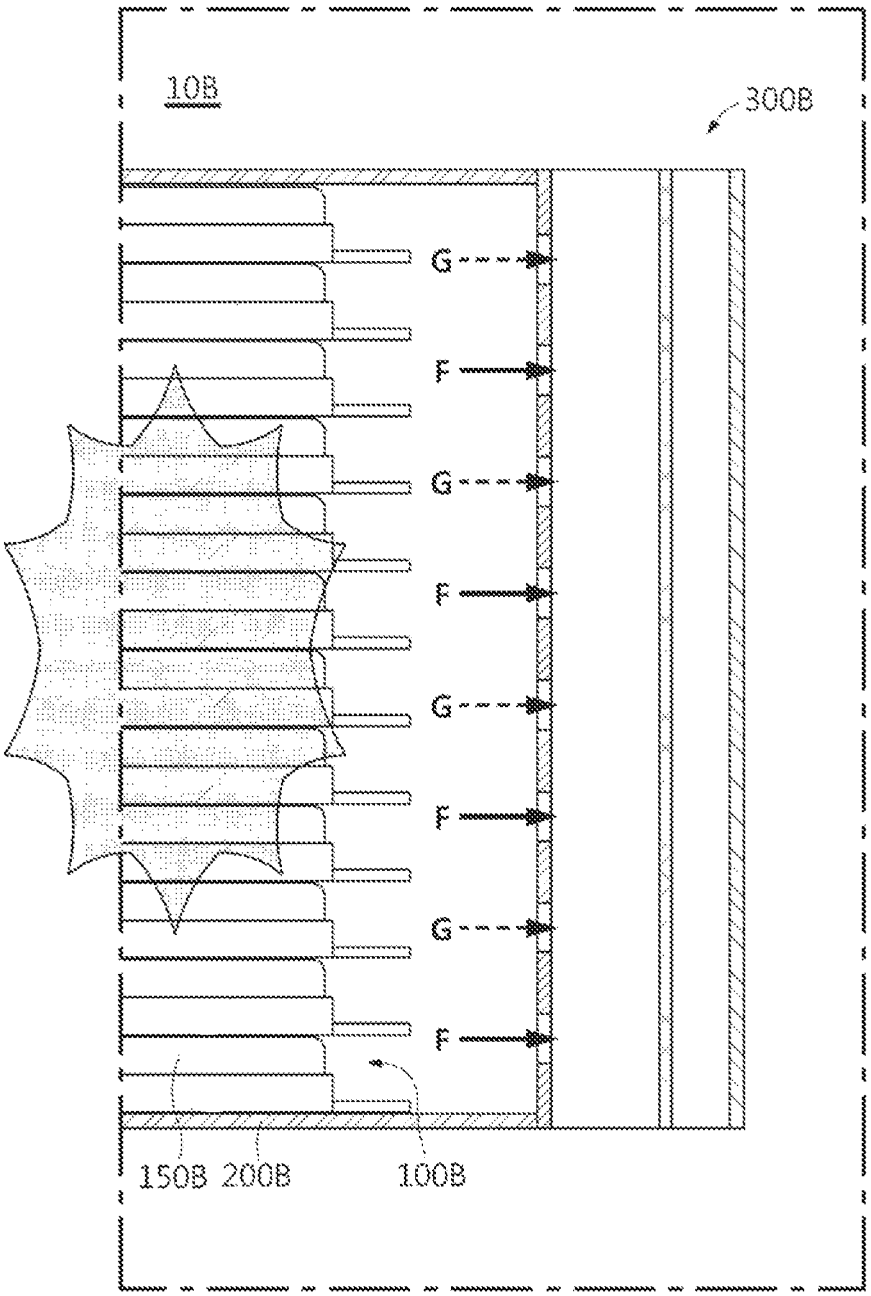
FIGS. 17 to 20 are diagrams for explaining blocking of external exposure of a flame or spark through the barrier unit during thermal runaway of a battery cell of the battery pack of FIG. 11.
Figure 18:
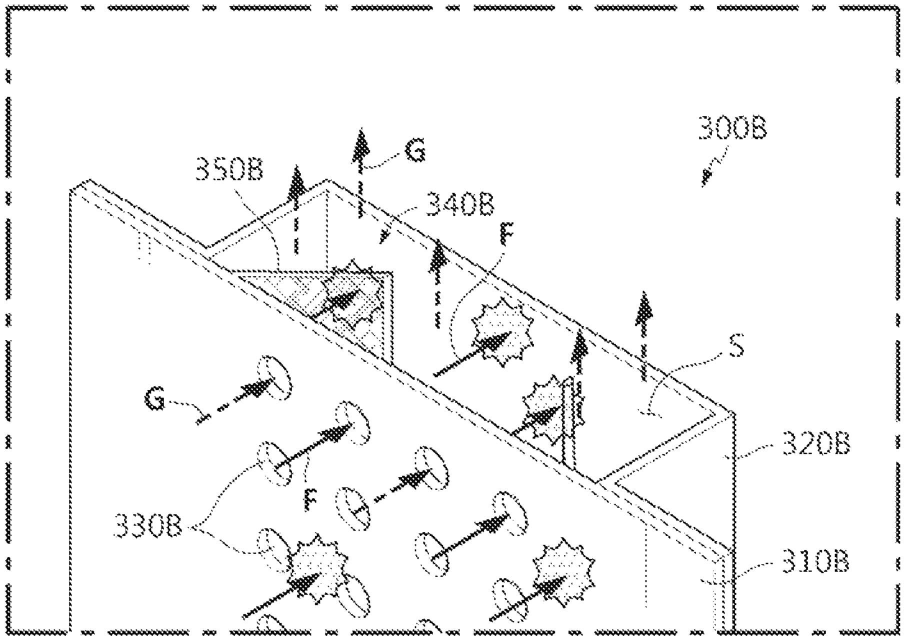
Figure 19:
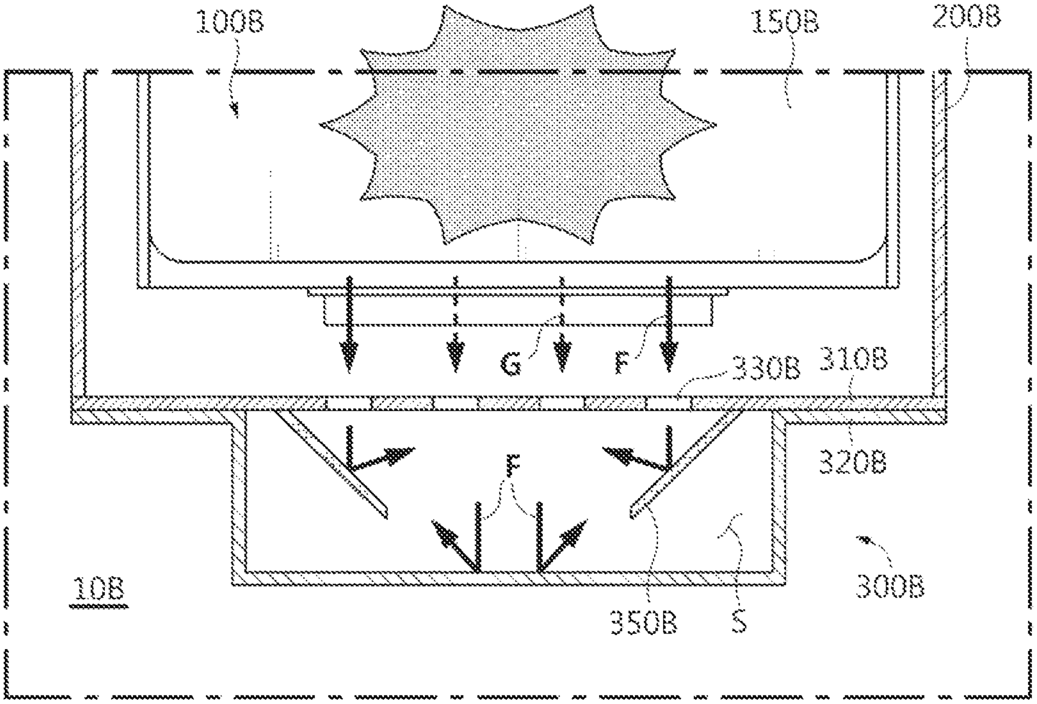
Figure 20:
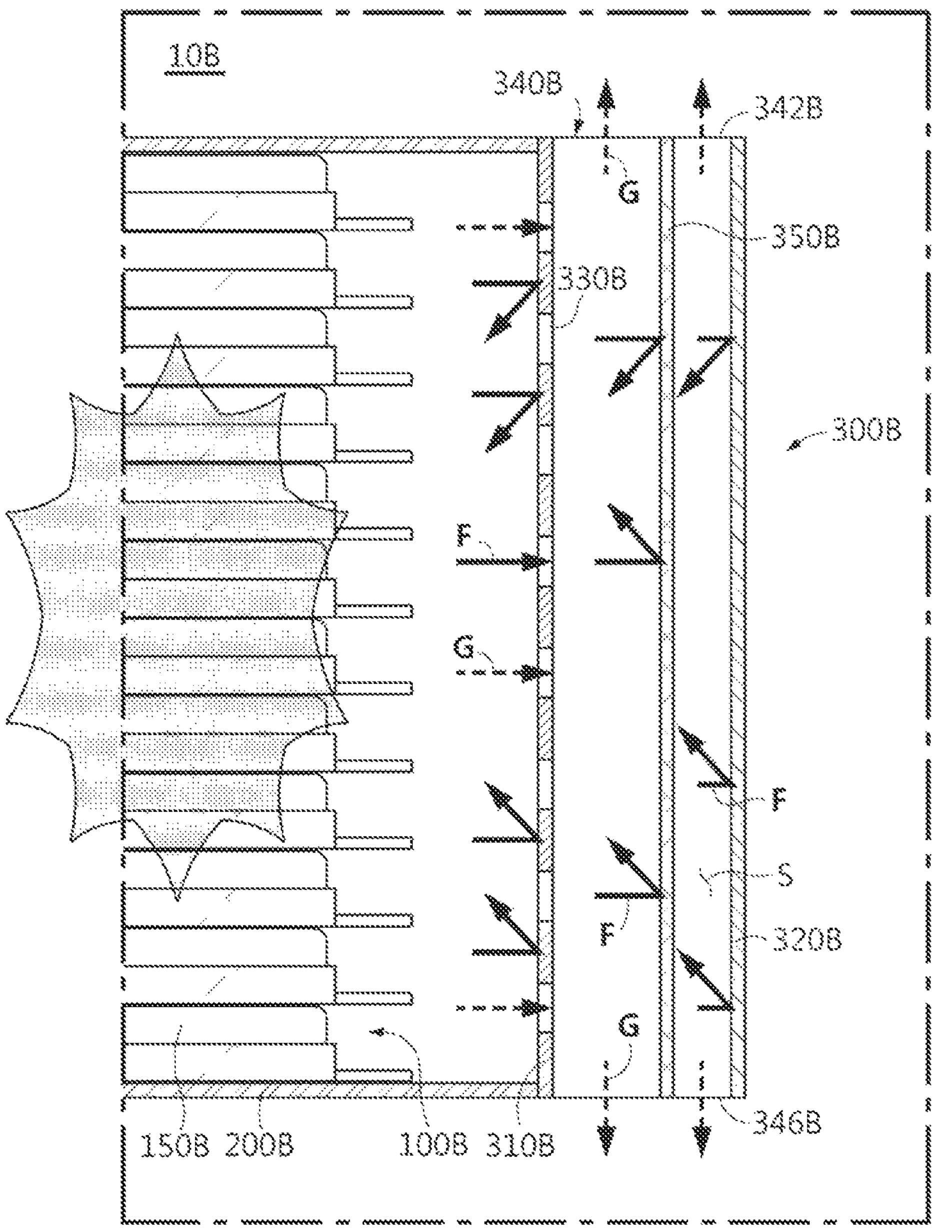

FIG. 16 is a diagram for explaining a barrier unit according to another embodiment of the present disclosure of FIG. 12.

Since the barrier unit 305B according to this embodiment is similar to the barrier unit 300B of the above embodiment, redundant description of components substantially the same as or similar to the above embodiment will be omitted, and hereinafter, differences from the above embodiment will be described.

The barrier unit 305B is provided as a pair and may include the first barrier 310B, the second barrier 320B, the vent hole 330B, the discharge opening 340B, the blocking baffle 350B, and the third barrier 390B, respectively.

Since the first barrier 310B, the second barrier 320B, the vent hole 330B, the discharge opening 340B, and the blocking baffle 350B are substantially the same as or similar to the above embodiment, redundant descriptions thereof are omitted.

The third barrier 390B covers the discharge opening 340B and may include a mesh network. The third barrier 390B may allow the vent gas (G, see FIGS. 17 to 20) to pass while maximally suppressing the passage of the flame or spark (F, see FIGS. 17 to 20) through the mesh network.

Accordingly, the barrier unit 305B according to this embodiment may more effectively block or suppress external exposure of the flame or spark (F, see FIGS. 17 to 20).

FIGS. 17 to 20 are diagrams for explaining blocking of external exposure of a flame or spark through the barrier unit during thermal runaway of a battery cell of the battery pack of FIG. 11.

Referring to FIGS. 17 to 20, in at least one battery cell 150B among the battery cells 150B of the battery module assembly 100B of the battery pack 10B, overheating or the like may occur due to an abnormal situation. In at least one battery cell 150B in which such an abnormal situation occurs, a vent gas G, flame or spark F may be discharged due to overheating or the like.

At this time, the barrier unit 300B according to this embodiment guides the discharge of the vent gas G to the outside of the pack case 200B, as in the above embodiment, and thus may effectively prevent thermal runaway or explosion of the entire battery module assembly 100B due to the vent gas G inside the battery pack 10B.

Specifically, as in the above embodiment, the barrier unit 300B guides the vent gas G into the space S through the vent holes 330B, and then may discharge the vent gas G to the outside of the pack case 200B through the upper opening 342B and the lower opening 346B of the discharge opening 340B.

In addition, the barrier unit 300B according to this embodiment, as in the above embodiment, may effectively prevent or suppress external exposure or ejection of the flame or spark F through the upper opening 342B and the lower opening 346B of the discharge opening 340B.

Specifically, the first barrier 310B of the barrier unit 300B may primarily block the flame or spark F. Here, the flame or spark F passing through the vent holes 330B of the first barrier 310B may be secondarily blocked by the pair of blocking baffles 350B in the space S. Finally, the flame or spark F passing between the pair of blocking baffles 350B may be blocked by the second barrier 320B.

As such, the barrier unit 300B according to this embodiment, as in the above embodiment, blocks the flame or spark F emitted from the battery cell 150B in which the abnormal situation occurs through the first barrier 310B, the pair of blocking baffles 350B and the second barrier 320B in multiple stages, and thus exposure or ejection of the flame or spark F to the outside of the discharge opening 340B may be prevented or significantly suppressed.

Accordingly, the barrier unit 300B according to this embodiment may guide the rapid discharge of the vent gas G emitted from the battery cell 150B to the outside of the pack case 200B in the abnormal situation, while, conversely, effectively preventing or suppressing exposure or ejection of the flame or spark F emitted from the battery cell 150B to the outside of the pack case 200B.

Therefore, the battery pack 10B according to this embodiment may effectively prevent a risk of greater fire or explosion that may be caused by the flame or spark F discharged to the outside of the pack case 200B in the abnormal situation.

Figure 21:
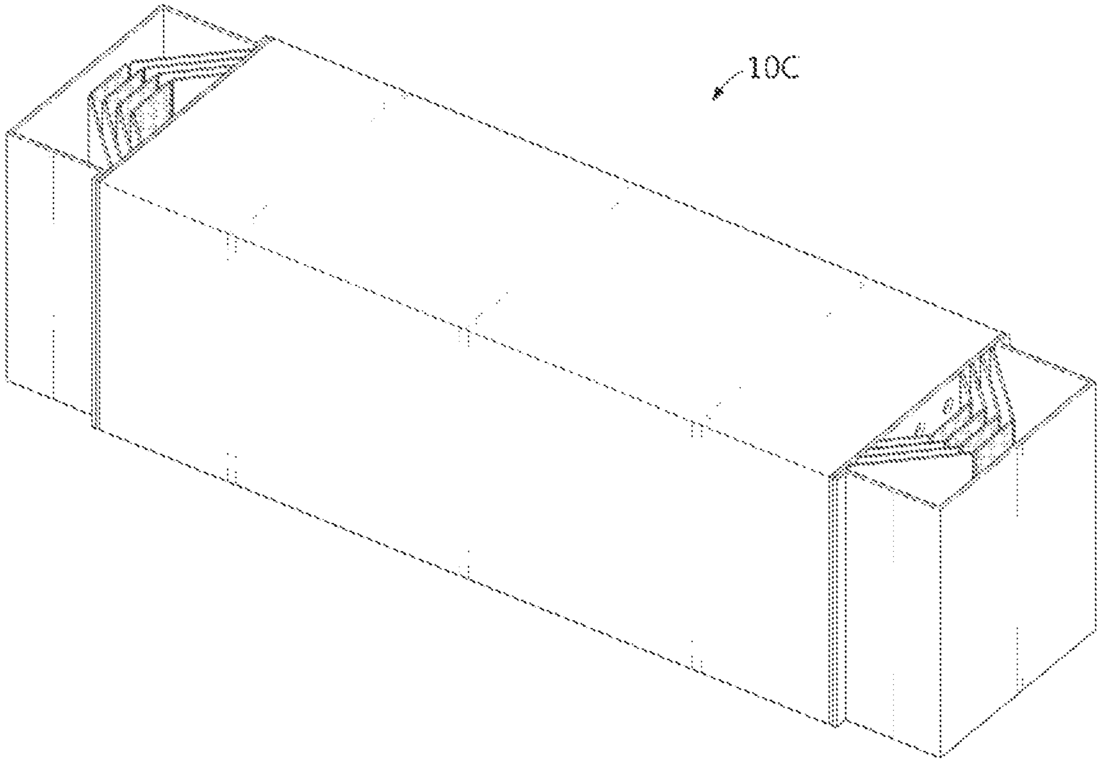
FIG. 21 is a diagram for explaining a battery pack according to still another embodiment of the present disclosure.
Figure 22:
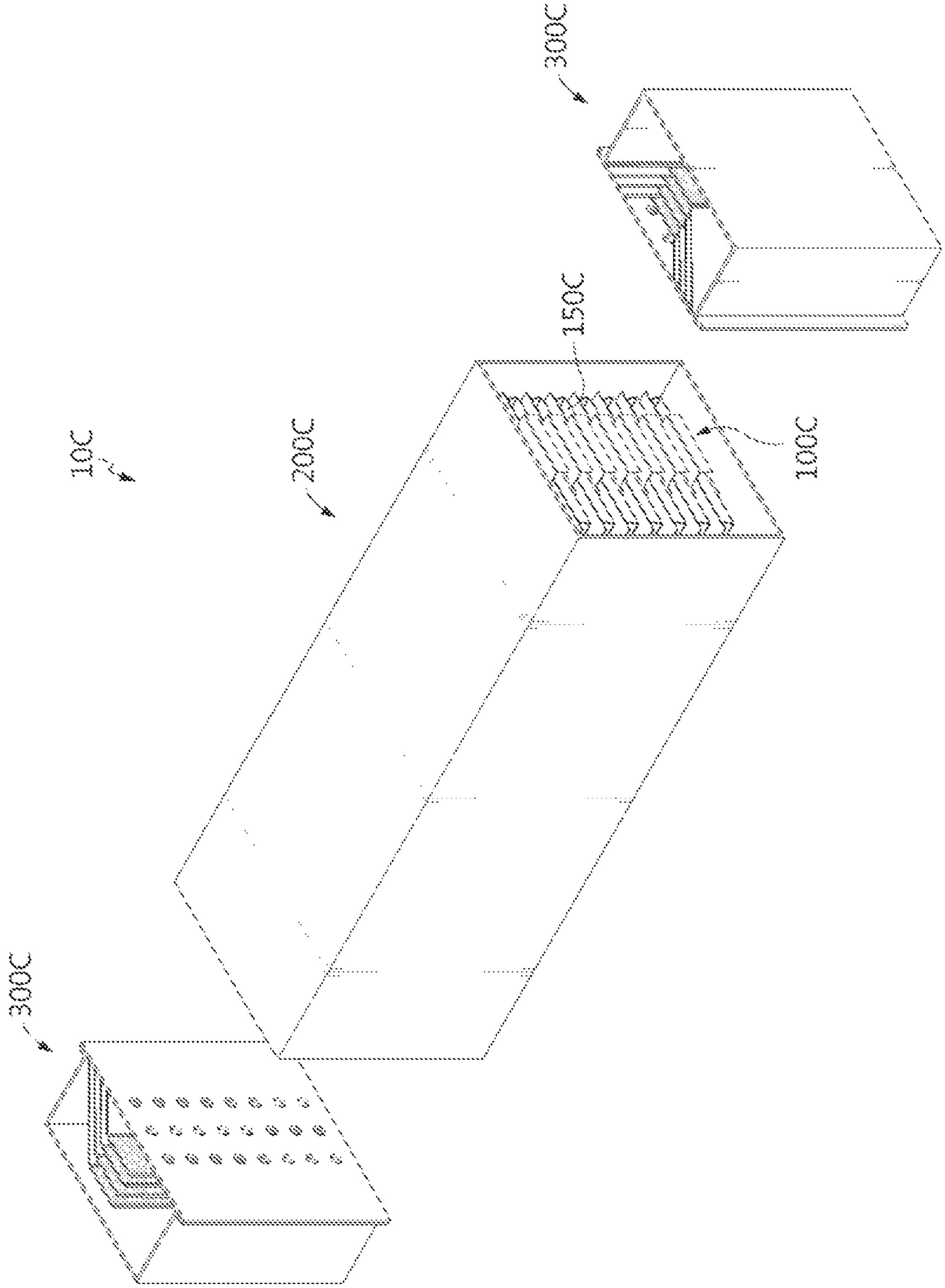
FIG. 22 is an exploded perspective view of the battery pack of FIG. 21.

FIG. 21 is a diagram for explaining a battery pack according to still another embodiment of the present disclosure, and FIG. 22 is an exploded perspective view of the battery pack of FIG. 21.

Referring to FIGS. 21 and 22, the battery pack 10C may include a battery module assembly 100C, a pack case 200C, and a barrier unit 300C.

As in the above embodiment, the battery module assembly 100C may include at least one or a plurality of battery cells 150C. Hereinafter, in this embodiment, the battery module assembly 100C is limitedly described as including a plurality of battery cells 150C.

As in the above embodiment, the plurality of battery cells 150C may be stacked with each other along the height direction of the battery module assembly 100C to be electrically connected to each other. In addition, the plurality of battery cells 150C may also be stacked with each other along the longitudinal direction of the battery module assembly 100C. Also, the plurality of battery cells 150C may be stacked with each other in both the longitudinal direction and the height direction of the battery module assembly 100C.

As in the above embodiment, the plurality of battery cells 150C are secondary batteries, and may be provided as a pouch-type secondary battery, a prismatic secondary battery, or a cylindrical secondary battery. Hereinafter, in this embodiment, the plurality of battery cells 150C will be described as being provided as a pouch-type secondary battery.

The pack case 200C may accommodate the battery module assembly 100C, as in the above embodiment. To this end, an accommodation space for accommodating the battery module assembly 100C may be provided in the pack case 200C.

The pack case 200C is formed with a predetermined length along the longitudinal direction of the battery pack 10C, and may be provided in a rectangular parallelepiped shape that is open in the longitudinal direction of the battery pack 10C.

The barrier unit 300C is provided on at least one side of the pack case 200C, discharges a vent gas (G, see FIGS. 28 to 31) in the pack case 200C to the outside of the pack case 200C, and may have a predetermined space (S, see FIGS. 25 and 26) for blocking the flame or spark (F, see FIGS. 28 to 31) generated from the at least one battery cell 150C.

The barrier unit 300C may be provided as a pair.

As in the above embodiments, the pair of barrier units 300C may be provided at both ends of the pack case 200C in the longitudinal direction of the pack case 200C. Specifically, the pair of barrier units 300C may be coupled with the pack case 200C in the longitudinal direction of the pack case 200C, respectively. The pair of barrier units 300C may package the battery module assembly 100C in the pack case 200C through coupling with the pack case 200C.

Hereinafter, the barrier unit 300C according to this embodiment will be described in more detail.

Figure 23:
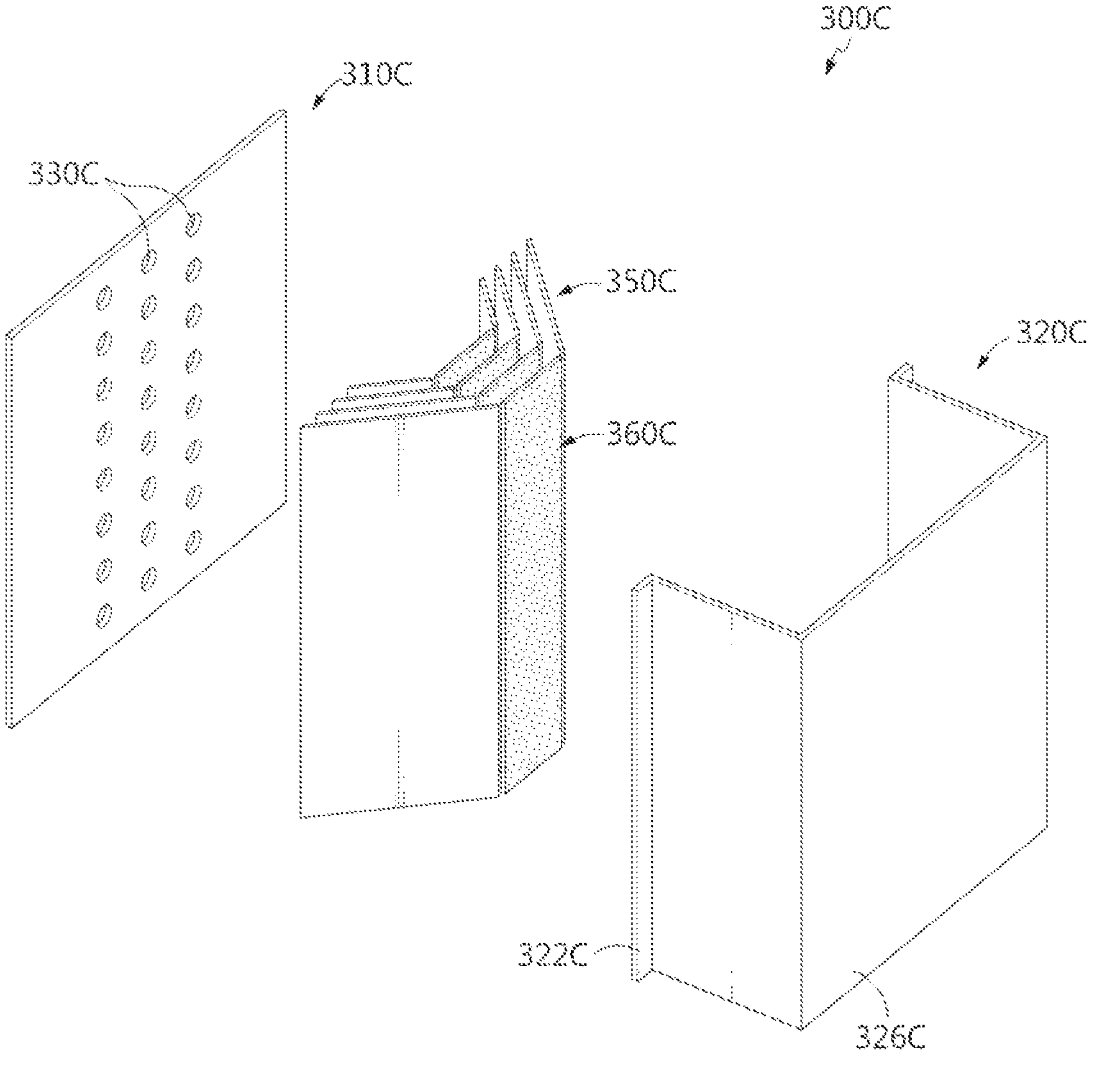
FIG. 23 is an exploded perspective view of a barrier unit of the battery pack of FIG. 22.
Figure 24:
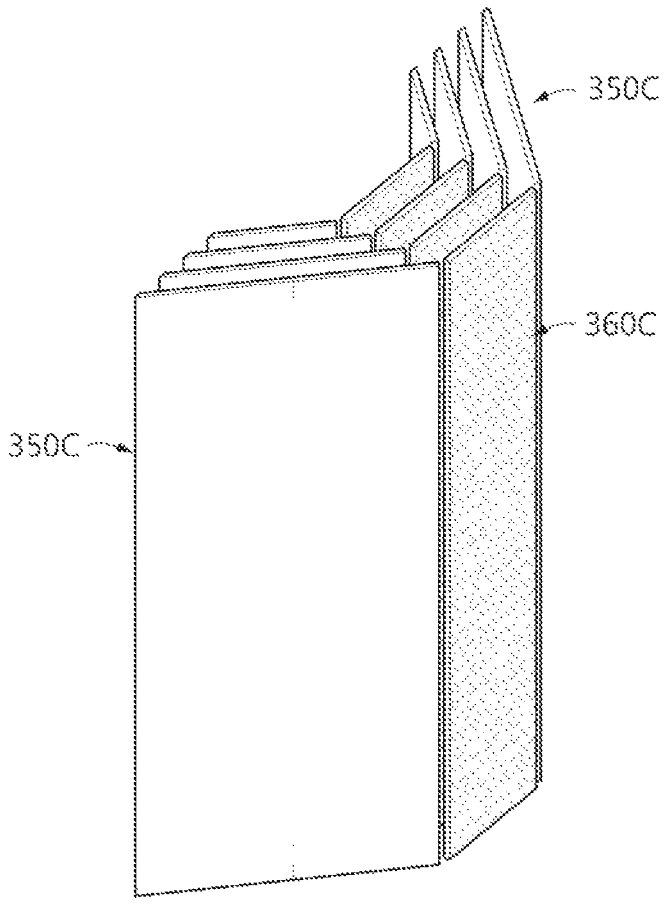
FIG. 24 is a diagram for explaining a blocking baffle and a mesh member of the barrier unit of FIG. 23.
Figure 25:
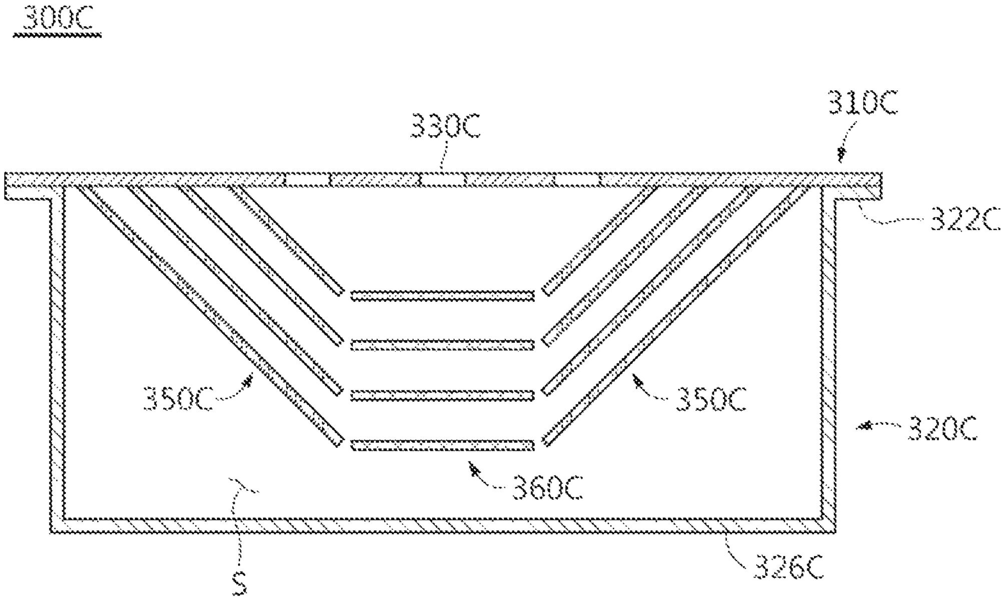
FIG. 25 is a plan view of the barrier unit of FIG. 23.
Figure 26:
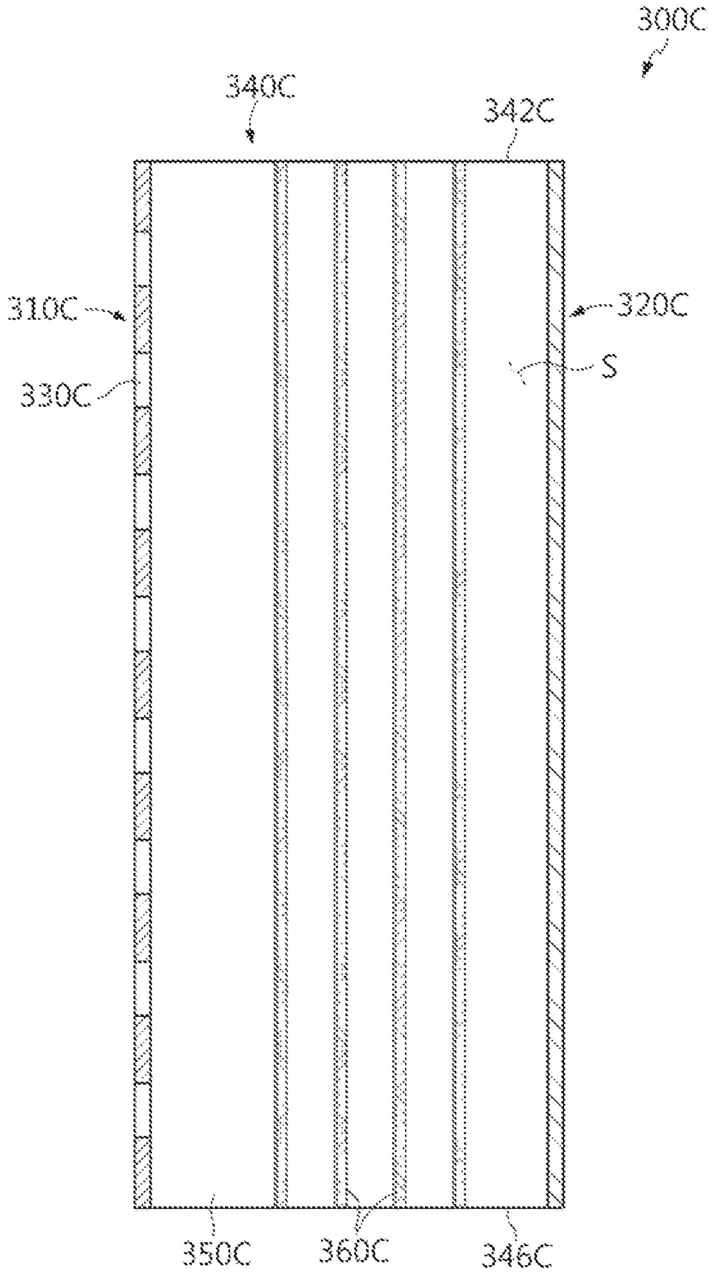
FIG. 26 is a cross-sectional side view of the barrier unit of FIG. 23.

FIG. 23 is an exploded perspective view of a barrier unit of the battery pack of FIG. 22, FIG. 24 is a diagram for explaining a blocking baffle and a mesh member of the barrier unit of FIG. 23, FIG. 25 is a plan view of the barrier unit of FIG. 23, and FIG. 26 is a cross-sectional side view of the barrier unit of FIG. 23.

Referring to FIGS. 23 to 26, the pair of barrier units 300C may include a first barrier 310C, a second barrier 320C, a vent hole 330C, a discharge opening 340C, a blocking baffle 350C, and a mesh member 360C, respectively.

The first barrier 310C has a substantially plate shape, is coupled to the pack case 200C in the longitudinal direction of the pack case 200C, and may include at least one blocking baffle 350C and a mesh member 360C described later.

One surface of the first barrier 310C may be disposed to face at least one battery cell 150C disposed at the outermost part of the battery module assembly 100C in the longitudinal direction of the pack case 200C. In the case of this embodiment, one surface of the first barrier 310C may be disposed to face a plurality of battery cells 150C disposed at the outermost part of the battery module assembly 100C.

The second barrier 320C, as in the above embodiment, is coupled with the first barrier 310C and may cover the blocking baffle 350C in the longitudinal direction of the pack case 200C. The second barrier 320C may be provided as a substantially U-shaped plate.

The second barrier 320C may be spaced apart from at least one vent hole 330C described later by a predetermined interval in the longitudinal direction of the pack case 200C to form a predetermined space S.

The second barrier 320C may include a coupling portion 322C and a space forming portion 326C.

As in the above embodiments, the coupling portion 322C is formed at both ends of the second barrier 320C and may be coupled to the first barrier 310C. The space forming portion 326C is formed by bending from the coupling portion 322C, and the space S may be formed by coupling the coupling portion 322C and the first barrier 310C.

The vent hole 330C, as in the above embodiments, is for exporting the vent gas (G, see FIGS. 28 to 31) to the outside of the pack case 200C, and may be provided in the first barrier 310C.

The vent hole 330C may be provided to face at least one battery cell 150C disposed at the outermost part of the battery module assembly 100C, in the longitudinal direction of the pack case 200C.

The vent hole 330C may be provided in at least one or in plurality. Hereinafter, in this embodiment, the vent hole 330C will be described as being provided in plurality.

The discharge opening 340C is for discharging the vent gas (G, see FIGS. 28 to 31) to the outside of the pack case 200C, communicates with the space S along the height direction of the pack case 200C, and may be formed by coupling the first barrier 310C and the second barrier 320C.

The discharge opening 340C may include an upper opening 342C and a lower opening 346C.

The upper opening 342C, as in the above embodiments, may be provided at an upper side of the barrier unit 300C. The lower opening 346C, as in the above embodiments, is spaced apart from the upper opening 342C and may be provided at a lower side of the barrier unit 300C.

The blocking baffle 350C is coupled to the first barrier 310C, is disposed in the space S, and may block the flame or spark (F, see FIGS. 28 to 31).

The blocking baffle 350C may be provided in plurality.

The plurality of blocking baffles 350C may be spaced apart from each other by a predetermined distance between the first barrier 310C and the second barrier 320C. In addition, the plurality of blocking baffles 350C may be inclined at a predetermined angle between the first barrier 310C and the second barrier 310C.

The mesh member 360C is provided in the space S and may be connected to the plurality of blocking baffle 350C through welding or bolting. Here, the mesh member 360C may be connected with the blocking baffle 350C to form a gap of a predetermined interval. This is to facilitate passage of the vent gas G between the mesh member 360C and the blocking baffle 350C.

The mesh member 360C may be provided in plurality.

The plurality of mesh members 360C may be spaced apart from each other by a predetermined distance between the first barrier 310C and the second barrier 320C. In addition, the plurality of mesh members 360C may be disposed between the plurality of blocking baffles 350C in the space S.

Specifically, each mesh member 360C may be disposed while forming a gap of a predetermined interval between the pair of blocking baffles 350C corresponding to each other. Accordingly, the plurality of mesh members 360C and the plurality of blocking baffles 350C may be arranged to have an approximate trapezoidal shape within the space S.

The plurality of mesh members 360C and the plurality of blocking baffles 350C may be disposed in the space S to surround the plurality of vent hole 330C when viewed from the top and bottom directions of the battery pack 10C. Here, the plurality of mesh members 360C and the plurality of blocking baffles 350C may be arranged to be spaced apart from each other by a predetermined distance to form a predetermined interval in the space S when viewed from the top and bottom directions of the battery pack 10C.

According to the arrangement of the plurality of mesh members 360C and the plurality of blocking baffles 350C, the flame or spark (F, see FIGS. 27 to 30) emitted from the battery cell 150C collides with the plurality of blocking baffles 350C or is filtered by the plurality of mesh members 360C in the traveling direction after passing through the vent holes 330C, and thus may not be exposed to the outside of the discharge opening 340C.

Figure 27:
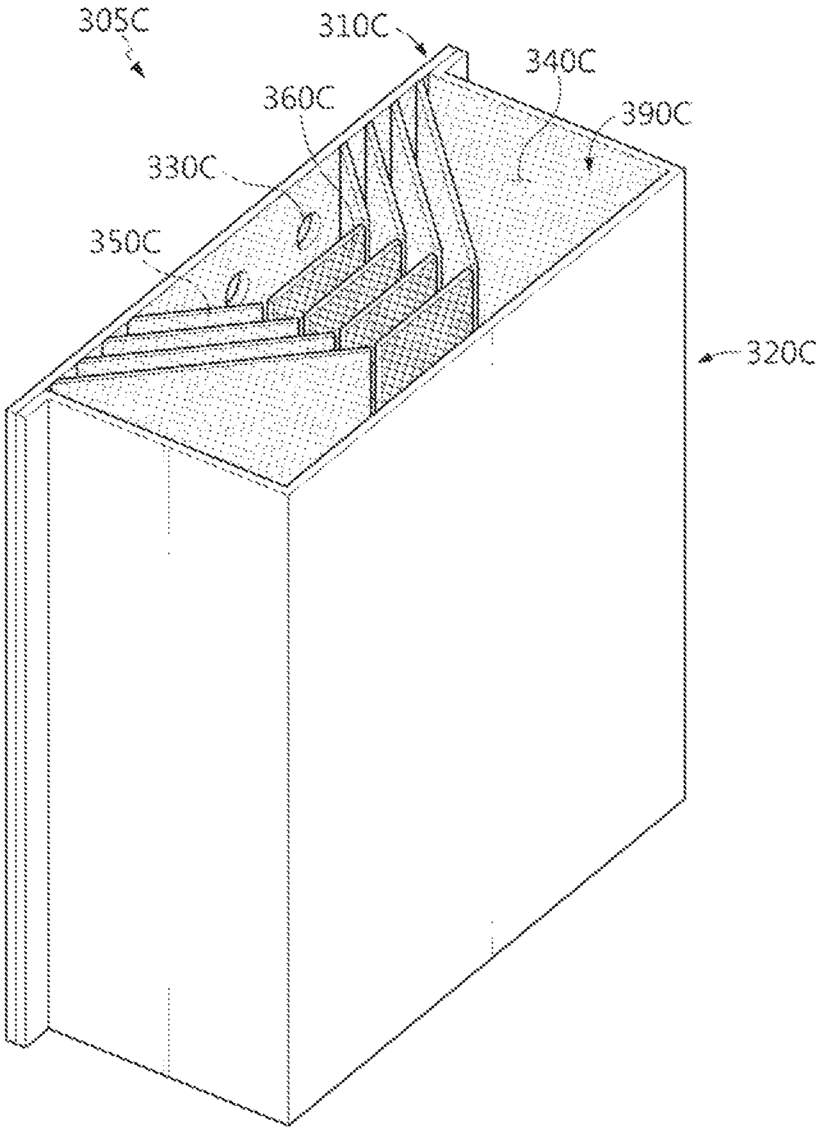
FIG. 27 is a diagram for explaining a barrier unit according to another embodiment of the present disclosure of FIG. 22.
Figure 28:
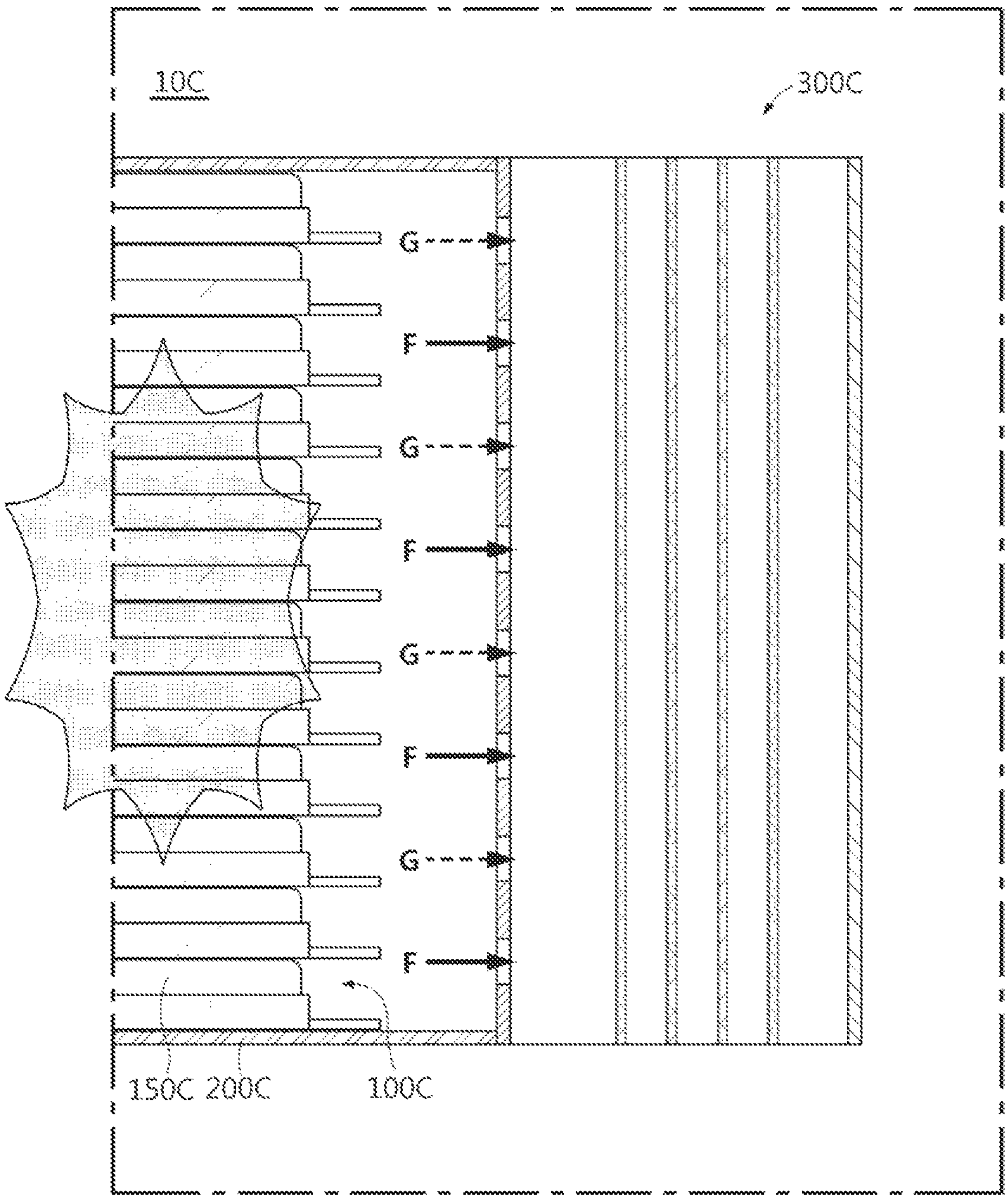
FIGS. 28 to 31 are diagrams for explaining blocking of external exposure of a flame or spark through a barrier unit during thermal runaway of a battery cell of the battery pack of FIG. 21.
Figure 29:
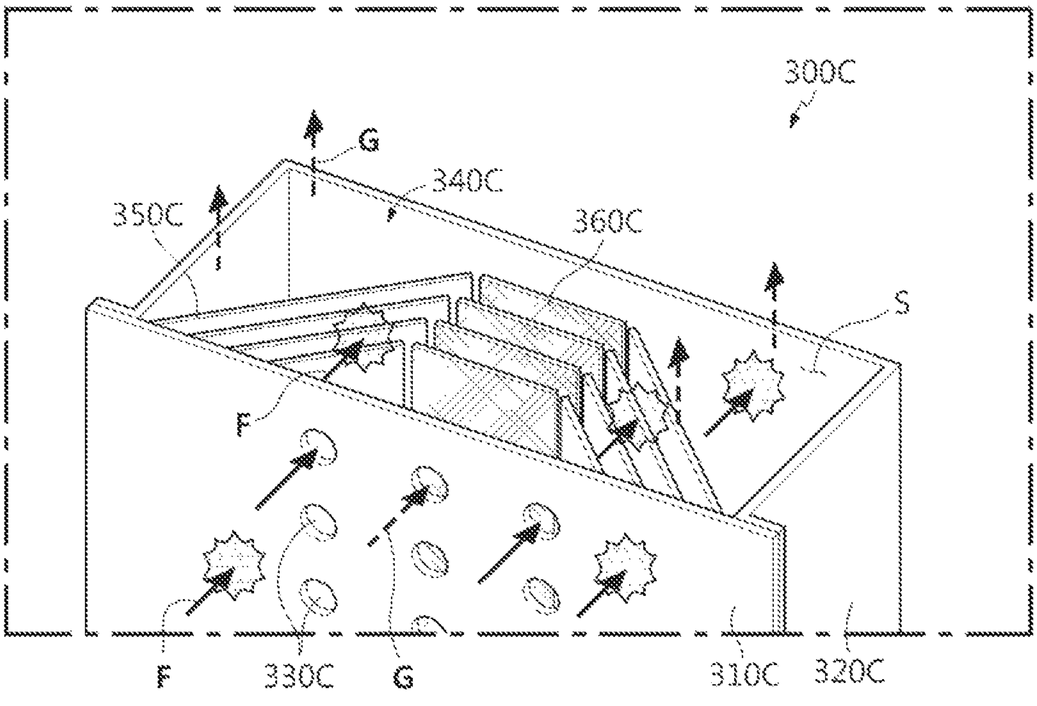
Figure 30:
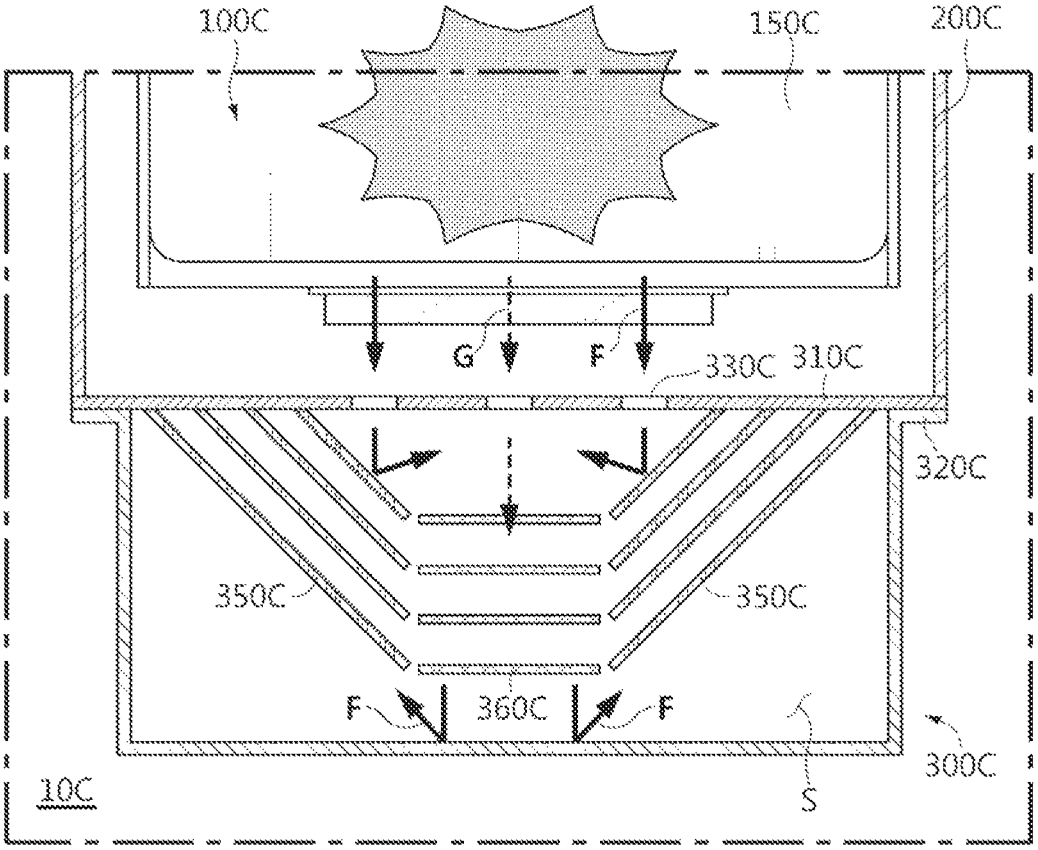
Figure 31:
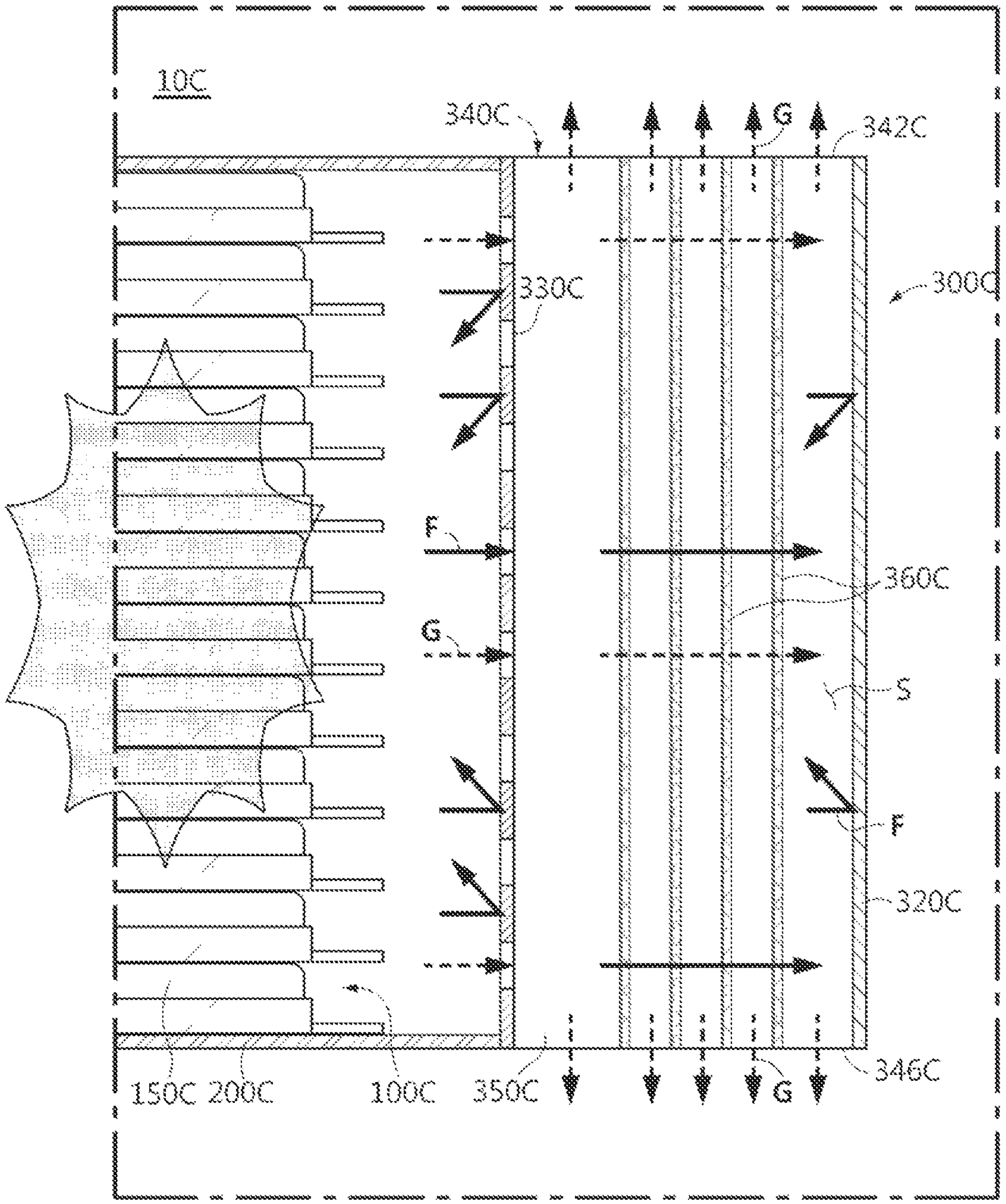

FIG. 27 is a diagram for explaining a barrier unit according to another embodiment of the present disclosure of FIG. 22.

Since the barrier unit 305C according to this embodiment is similar to the barrier unit 300C of the above embodiment, redundant description of components substantially the same as or similar to the above embodiment will be omitted, and hereinafter, differences from the above embodiment will be described.

The barrier unit 305C is provided as a pair and may include the first barrier 310C, the second barrier 320C, the vent hole 330C, the discharge opening 340C, the blocking baffle 350C, the mesh member 360C, and the third barrier 390C, respectively.

Since the first barrier 310C, the second barrier 320C, the vent hole 330C, the discharge opening 340C, the blocking baffle 350C, and the mesh member 360C are substantially the same as or similar to the above embodiment, redundant descriptions will be omitted below.

The third barrier 390C covers the discharge opening 340C and may include a mesh network. The third barrier 390C may allow the vent gas (G, see FIGS. 28 to 31) to pass while maximally suppressing the passage of the flame or spark (F, see FIGS. 28 to 31) through the mesh network.

Accordingly, the barrier unit 305C according to this embodiment may more effectively block or suppress external exposure of the flame or spark (F, see FIGS. 28 to 31).

FIGS. 28 to 31 are diagrams for explaining blocking of external exposure of a flame or spark through a barrier unit during thermal runaway of a battery cell of the battery pack of FIG. 21.

Referring to FIGS. 28 to 31, in at least one battery cell 150C among the battery cells 150C of the battery module assembly 100C of the battery pack 10C, overheating or the like may occur due to an abnormal situation. In at least one battery cell 150C in which such an abnormal situation occurs, a vent gas G, flame or spark F may be discharged due to overheating or the like.

At this time, the barrier unit 300C according to this embodiment guides the discharge of the vent gas G to the outside of the pack case 200C, as in the above embodiments, and thus may effectively prevent thermal runaway or explosion of the entire battery module assembly 100C due to the vent gas G inside the battery pack 10C.

Specifically, as in the above embodiment, the barrier unit 300C guides the vent gas G into the space S through the vent holes 330C, and then may discharge the vent gas G to the outside of the pack case 200C through the upper opening 342C and the lower opening 346C of the discharge opening 340C.

In addition, the barrier unit 300C according to this embodiment, as in the above embodiments, may effectively prevent or suppress external exposure or ejection of the flame or spark F through the upper opening 342C and the lower opening 346C of the discharge opening 340C.

Specifically, the first barrier 310C of the barrier unit 300C may primarily block the flame or spark F. Here, the flame or spark F passing through the vent holes 330C of the first barrier 310C may be secondarily blocked or filtered by the plurality of blocking baffles 350C and plurality of mesh members 360C within the space S. Finally, the flame or spark F passing between the plurality of blocking baffle 350C and the plurality of mesh members 360C may be blocked by the second barrier 320C.

As such, the barrier unit 300C according to this embodiment blocks the flame or spark F emitted from the battery cell 150C in which the abnormal situation occurs through the first barrier 310C, the plurality of blocking baffles 350C, the plurality of mesh members 360C and the second barrier 320C in multiple stages, and thus exposure or ejection of the flame or spark F to the outside of the discharge opening 340C may be prevented or significantly suppressed.

Accordingly, the barrier unit 300C according to this embodiment may guide the rapid discharge of the vent gas G emitted from the battery cell 150C to the outside of the pack case 200C in the abnormal situation, while, conversely, effectively preventing or suppressing exposure or ejection of the flame or spark F emitted from the battery cell 150C to the outside of the pack case 200C.

Therefore, the battery pack 10C according to this embodiment may effectively prevent a risk of greater fire or explosion that may be caused by the flame or spark F discharged to the outside of the pack case 200C in the abnormal situation.

Figure 32:
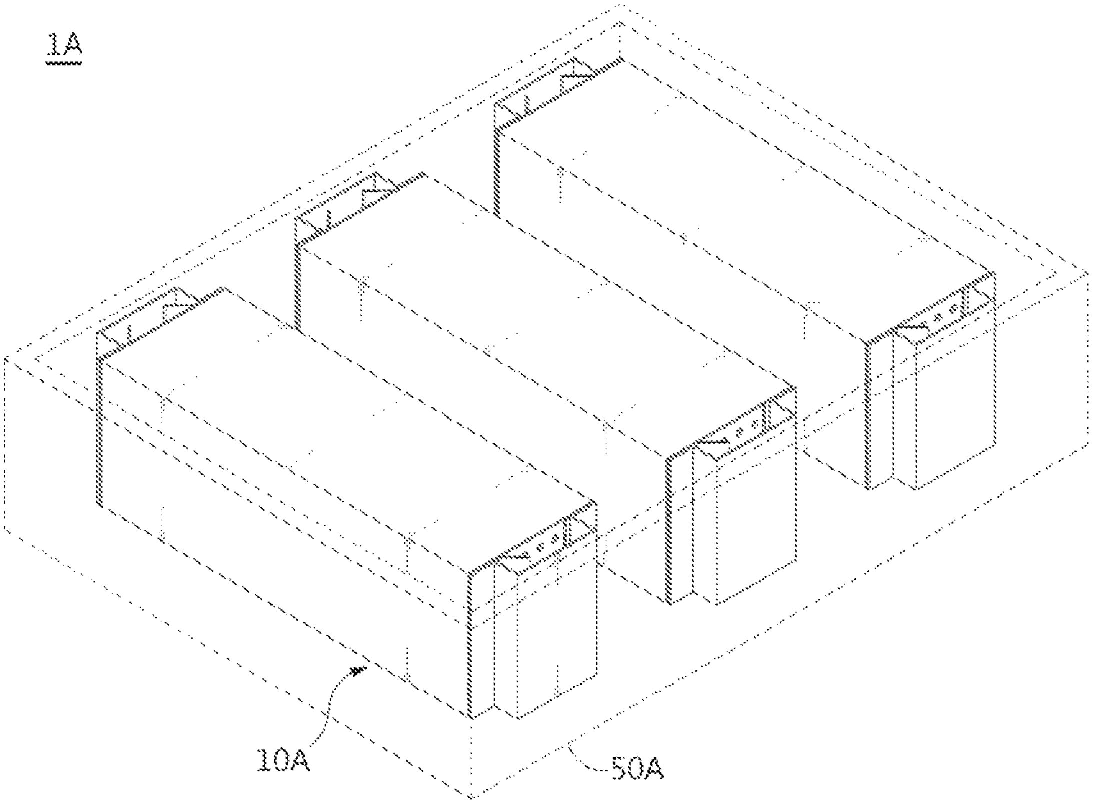
FIGS. 32 to 34 are diagrams for explaining an energy storage system according to an embodiment of the present disclosure.
Figure 33:
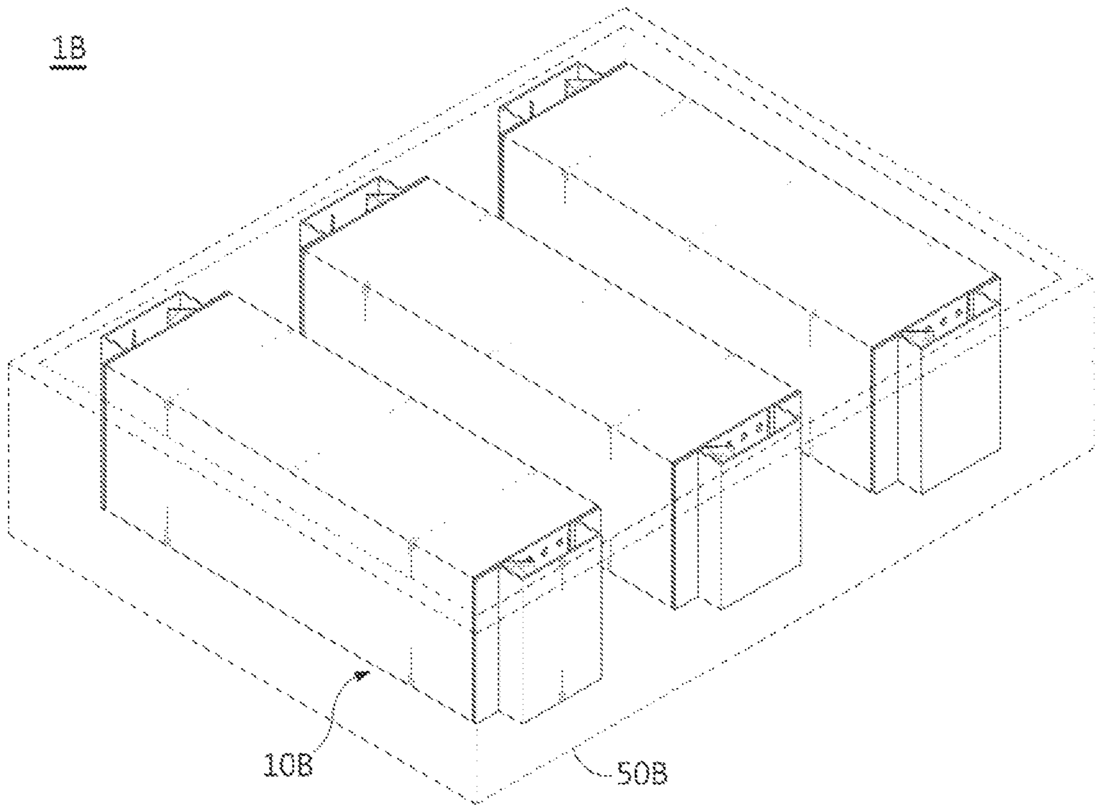
Figure 34:
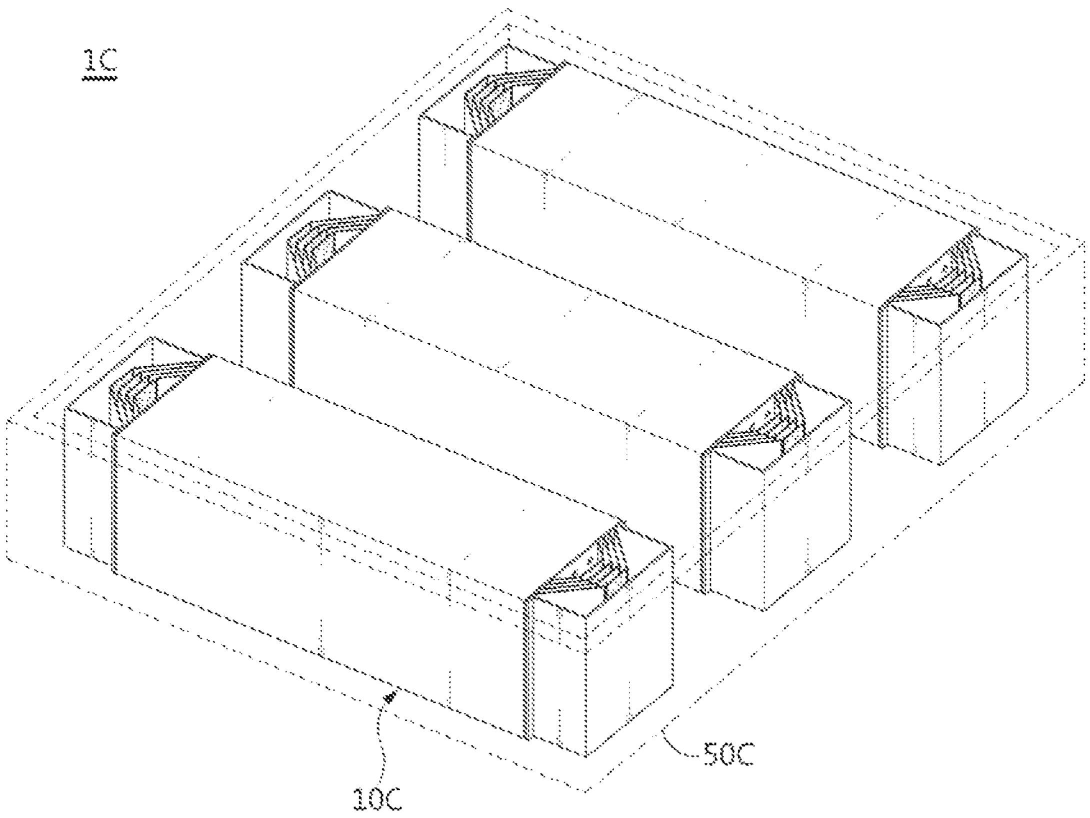

FIGS. 32 to 34 are diagrams for explaining an energy storage system according to an embodiment of the present disclosure.

Referring to FIGS. 32 to 34, an energy storage system 1A, 1B, 1C may include at least one or a plurality of battery packs 10A, 10B, 10C, and a container 50A, 50B, 50C for accommodating the at least one or plurality of battery packs 10A, 10B, 10C.

In addition, the at least one or plurality of battery packs 10A, 10B, 10C of the above embodiment may be provided in a vehicle as an energy source of the vehicle. In addition, the battery pack 10A, 10B, 10C may also be provided in other devices, instruments, facilities, or the like using secondary batteries in addition to the vehicle.

In this way, the device, instrument, or facility having the battery pack 10A, 10B, 10C, such as the energy storage system 1A, 1B, 1C or the vehicle according to this embodiment may implement a device, instrument, or facility such as the energy storage system 1A, 1B, 1C or the vehicle having all the advantages of the battery pack 10A, 10B, 10C.

According to various embodiments as described above, it is possible to provide a battery pack 10A, 10B, 10C capable of blocking external exposure of a flame or spark F generated in an abnormal situation of a battery cell 150A, 150B, 150C, and an energy storage system 1A, 1B, 1C and a vehicle including the battery pack 10A, 10B, 10C.

While the preferred embodiments of the present disclosure have been shown and described, the present disclosure is not limited to the specific embodiments described above, various modifications may be made by one of ordinary skill in the art to which the present disclosure pertains without departing from the gist of the present disclosure as defined by the claims, and these modifications should not be individually understood from the technical feature or prospect of the present disclosure.

What is claimed is:

1. A battery pack comprising:
- a battery module assembly including at least one battery cell;
- a pack case configured to accommodate the battery module assembly; and
- a barrier provided on at least one side of the pack case, the barrier configured to discharge a vent gas in the pack case to an outside of the pack case and having a pair of blocking baffles disposed obliquely to a side of the pack case at a predetermined inclination angle, the barrier including at least one vent hole located between the pair of blocking baffles.

2. The battery pack according to claim 1, wherein the barrier further includes:
- a first barrier coupled to the pack case and having the pair of blocking baffles; and
- a second barrier coupled to the first barrier and configured to cover the pair of blocking baffles in a longitudinal direction of the pack case.

3. The battery pack according to claim 2, wherein a first surface of the first barrier faces the battery module assembly in the longitudinal direction of the pack case.

4. The battery pack according to claim 3, wherein the at least one vent hole is for discharging the vent gas to the outside of the pack case.

5. The battery pack according to claim 4, wherein the pair of blocking baffles are provided on a second surface of the first barrier, the pair of blocking baffles at least partially covering the at least one vent hole.

6. The battery pack according to claim 4, wherein the second barrier is spaced apart from the at least one vent hole by a predetermined interval in the longitudinal direction of the pack case to form a predetermined space.

7. The battery pack according to claim 6, wherein the pair of blocking baffles are disposed in the predetermined space.

8. The battery pack according to claim 6, wherein the barrier includes at least one discharge opening communicating with the predetermined space along a height direction of the pack case and formed by coupling the first barrier and the second barrier.

9. The battery pack according to claim 8, wherein the at least one discharge opening includes:
- an upper opening provided at an upper side of the barrier; and
- a lower opening spaced apart from the upper opening and provided at a lower side of the barrier.

10. The battery pack according to claim 8, further comprising a mesh covering the at least one discharge opening of the barrier.

11. The battery pack according to claim 1, wherein the barrier is provided at both ends of the pack case in a longitudinal direction of the pack case.

12. A battery pack comprising:
- a battery module assembly including at least one battery cell;
- a pack case configured to accommodate the battery module assembly; and
- a barrier provided on at least one side of the pack case, the barrier configured to discharge a vent gas in the pack case to an outside of the pack case and having a pair of blocking baffles with a mesh structure, the barrier including at least one vent hole located between the pair of blocking baffles.

13. The battery pack according to claim 12, wherein each baffle of the pair of baffles includes a first end connected to the pack case, and
- wherein the mesh structure extends between second ends of the pair of baffles.

14. A battery pack comprising:
- a battery module assembly including at least one battery cell;
- a pack case configured to accommodate the battery module assembly; and
- a barrier provided on at least one side of the pack case, the barrier configured to discharge a vent gas in the pack case to an outside of the pack case and having a predetermined space for blocking flame or spark generated from the at least one battery cell, the barrier including a pair of blocking baffles and at least one vent hole located between the pair of blocking baffles.

15. An energy storage system comprising at least one battery pack according to claim 1.

16. A vehicle comprising at least one battery pack according to claim 1.

* * * * *